(12) United States Patent
Kumar et al.

(10) Patent No.: US 11,502,923 B1
(45) Date of Patent: Nov. 15, 2022

(54) ANALYTIC INTERACTIVE VISUALIZATION SYSTEM AND METHOD

(71) Applicant: User Testing, Inc., San Francisco, CA (US)

(72) Inventors: Ranjitha Kumar, San Jose, CA (US); Doug Puett, Mountain View, CA (US); Kaj T. van de Loo, San Francisco, CA (US); Aravind Sagar, San Francisco, CA (US); Amanda L. Morgan, San Mateo, CA (US); Scott Hutchins, Irvine, CA (US); Krystal Kavney, Alameda, CA (US); Charulata Mehra, San Jose, CA (US)

(73) Assignee: USER TESTING, INC., San Francisco, CA (US)

( * ) Notice: Subject to any disclaimer, the term of this patent is extended or adjusted under 35 U.S.C. 154(b) by 0 days.

(21) Appl. No.: 17/116,840

(22) Filed: Dec. 9, 2020

Related U.S. Application Data

(60) Provisional application No. 63/059,869, filed on Jul. 31, 2020.

(51) Int. Cl.
*H04L 43/045* (2022.01)
*G06T 11/20* (2006.01)
(Continued)

(52) U.S. Cl.
CPC .......... *H04L 43/045* (2013.01); *G06F 3/0482* (2013.01); *G06F 3/0484* (2013.01);
(Continued)

(58) Field of Classification Search
None
See application file for complete search history.

(56) References Cited

U.S. PATENT DOCUMENTS

| | | | | |
|---|---|---|---|---|
| 5,995,113 A | * | 11/1999 | Mitchell | G06F 11/3664 714/E11.212 |
| 9,063,803 B1 | * | 6/2015 | Lewkovitz | G06F 11/1438 |

(Continued)

OTHER PUBLICATIONS

Schulz, "Path analysis with SAS Visual Analytics," Aug. 19, 2014, https://blogs.sas.com/content/sascom/2014/08/19/path-analysis-with-sas-visual-analytics/.*

(Continued)

*Primary Examiner* — Ryan Barrett
(74) *Attorney, Agent, or Firm* — Schwegman Lundberg & Woessner, P.A.

(57) ABSTRACT

A digital experience management system comprising: the displaying on an electronic display screen a plurality of sequentially ordered node indicators, each node indicator having a respective sequence position; the system storing multiple session information structures, each respective session information structure including multiple sequentially ordered clusters of user experience information, each cluster of user experience having a sequence position that matches a sequence position of a node indicator; responding to a user selection of a respective node indicator, by displaying on the electronic display screen, each respective cluster of user experience information having a sequence position that matches a sequence position of the respective selected node indicator.

42 Claims, 31 Drawing Sheets

(51) Int. Cl.

| | |
|---|---|
| *G06F 3/0482* | (2013.01) |
| *G06F 3/04817* | (2022.01) |
| *G06F 11/34* | (2006.01) |
| *G06F 3/0484* | (2022.01) |
| *G06F 16/904* | (2019.01) |
| *H04L 67/50* | (2022.01) |

(52) U.S. Cl.
CPC ...... *G06F 3/04817* (2013.01); *G06F 11/3438* (2013.01); *G06F 16/904* (2019.01); *G06T 11/206* (2013.01); *H04L 67/535* (2022.05); *G06F 2201/86* (2013.01)

(56) References Cited

U.S. PATENT DOCUMENTS

| | | | | |
|---|---|---|---|---|
| 9,305,268 | B2* | 4/2016 | Wu | G06F 11/3438 |
| 9,372,592 | B1* | 6/2016 | Goodspeed | G06Q 10/10 |
| 9,766,769 | B1* | 9/2017 | Webber | G06F 40/14 |
| 9,927,947 | B1* | 3/2018 | Webber | G06F 9/451 |
| 10,853,218 | B1* | 12/2020 | Beaman | G06F 11/3438 |
| 11,036,524 | B1* | 6/2021 | Mastracci | G06F 9/451 |
| 2006/0005132 | A1* | 1/2006 | Herdeg, III | G06F 11/3684 |
| | | | | 714/E11.193 |
| 2011/0173589 | A1* | 7/2011 | Guttman | H04L 43/50 |
| | | | | 717/125 |
| 2011/0191676 | A1* | 8/2011 | Guttman | G06F 3/048 |
| | | | | 715/768 |
| 2011/0234595 | A1* | 9/2011 | Poston | G06F 3/0481 |
| | | | | 345/440 |
| 2012/0159324 | A1* | 6/2012 | Chavez | G16H 40/20 |
| | | | | 715/704 |
| 2012/0174069 | A1* | 7/2012 | Zavatone | G06F 11/3692 |
| | | | | 717/124 |
| 2013/0132833 | A1* | 5/2013 | White | G06F 3/048 |
| | | | | 715/704 |
| 2013/0159784 | A1* | 6/2013 | Rossi | G06F 11/3684 |
| | | | | 714/47.1 |
| 2015/0160836 | A1* | 6/2015 | Lafreniere | H04N 21/854 |
| | | | | 715/723 |
| 2016/0188548 | A1* | 6/2016 | Ciabarra, Jr. | G06F 16/986 |
| | | | | 715/234 |
| 2018/0173375 | A1* | 6/2018 | Webber | G06F 3/0481 |
| 2019/0004823 | A1* | 1/2019 | Walker | G06F 11/3438 |
| 2019/0361572 | A1* | 11/2019 | Webber | G06F 11/302 |
| 2021/0055836 | A1* | 2/2021 | Webber | G06F 11/302 |
| 2021/0357939 | A1* | 11/2021 | Davis | G06F 11/3664 |
| 2022/0046038 | A1* | 2/2022 | Sinha | H04L 63/0236 |

OTHER PUBLICATIONS

Simonovsky, "Behavior Flow and User Flow," Aug. 9, 2016, https://stony.me/google-analytics-explained-behaviour-and-user-flow-report/.*

"Building a data-informed onboarding experience", Pendo, [Online] Retrieved form the Internet: <URL: https://web.archive.org/web/20200815052748/https://www.pendo.io/resources/building-a-data-informed-onboarding-experience/>, (cached Aug. 15, 2020), 9 pgs.

"Introducing Flow Visualization: Visualizing Visitor Flow", Google Analytics Solutions, [Online] Retrieved from the Internet: <URL: https://analytics.googleblog.com/2011/10/introducing-flow-visualization.html>, (Oct. 19, 2011), 6 pgs.

"Maximizing Process Performance with Maze, Uber's Funnel Visualization Platform", Uber Engineering, [Online] Retrieved from the Internet: <URL: https://eng.uber.com/maze/>, (Aug. 16, 2018), 13 pgs.

"MutationObserver", MDN, [Online] Retrieved from the Internet: <URL:https://web.archive.org/web/20201130034119/https://developer.mozilla.org/en-US/docs/Web/API/MutationObserver>, (Sep. 16, 2020), 7 pgs.

Ayres, Jay, et al., "Sequential PAttern Mining using a Bitmap Representation", Proc. ACM SIGKDD, (2002), 429-435.

Bostock, Michael, et al., "D3: Data-Driven Documents", IEEE Transactions on Visualization and Computer Graphics, 17(12), (Dec. 2011), 9 pgs.

Deka, Biplab, et al., "ERICA: Interactive Mining Mobile Apps", Proc. UIST. ACM, 767-776, (2016), 7 pgs.

Deka, Biplab, et al., "Rico: A Mobile App Dataset for Building Data-Driven Design Applications", Proc. UIST ACM, 845-854, (2017), 10 pgs.

Deka, Biplab, et al., "ZIPT: Zero-Integration Performance Testing of Mobile App Designs.", Proc UIST ACM, (2017), 727-736.

Durbin, Richard, et al., "Biological sequence analysis Probabilistic models of proteins and nucleic acids", Cambridge University Press, (1998), 366 pgs.

Fournier-Viger, Philippe, et al., "VMSP: Efficient vertical mining of maximal sequential patterns.", Canadian conference on artificial intelligence. Springer, 83-94., (2014), 12 pgs.

Gotz, David, et al., "DecisionFlow: Visual Analytics for High-Dimensional Temporal Event Sequence Data", IEEE Transactions on Visualization and Computer Graphics, 20(12), (Dec. 2014), 1783-1792.

Keim, Daniel A, et al., "FP-Viz: Visual Frequent Pattern Mining", IEEE Symposium on Information Visualization (InfoVis 05), (2005), 2 pgs.

Kruskal, Joseph B, et al., "Icicle plots: Better displays for hierarchical clustering", The American Statistician, 37(2), (1983), 162-168.

Kumar, Ranjitha, et al., "Bricolage: Example-Based Retargeting for Web Design", Proc. CHI ACM, (2011), 10 pgs.

Kumar, Ranjitha, et al., "Webzeitgeist: Design Mining the Web", Proc. CHI ACM, 3083-3092, (2013), 10 pgs.

Liu, Bing, "CH. 1: A Survey of Opinion Mining and Sentiment Analysis", Mining Text Data, Springer, Boston, MA, 415-463, (2012), 49 pgs.

Liu, Thomas, et al., "Learning Design Semantics for Mobile Apps", Proc. UIST. ACM, 569-579, (2018), 11 pgs.

Liu, Zhicheng, et al., "CoreFlow: Extracting and Visualizing Branching Patterns from Event Sequences", Eurographics Conference on Visualization (EuroVis) 2017, 36(3), (2017), 12 pgs.

Liu, Zhicheng, et al., "Patterns and Sequences: Interactive Exploration of Clickstreams to Understand Common Visitor Paths", IEEE Transactions on Visualization and Computer Graphics, 23(1), 321-33, (2016), 10 pgs.

Liu, Zipeng, et al., "Data-driven Multi-level Segmentation of Image Editing Logs", Proc. CHI ACM, (Apr. 2020), 12 pgs.

Malik, Sana, et al., "Cohort Comparison of Event Sequences with Balanced Integration of Visual Analytics and Statistics", Proc. International Conference on Intelligent User Interfaces. ACM, (2015), 12 pgs.

Malik, Sana, "High-Volume Hypothesis Testing: Systematic Exploration of Event Sequence Comparisons", ACM Transactions on Interactive Intelligent Systems, 6(1)-9, (Mar. 2016), 23 pgs.

Monroe, Megan, et al., "Temporal Event Sequence Simplification", IEEE Transactions on Visualization and Computer Graphics, 19(12), (Dec. 2013), 2227-2236.

Naveed, Tahir, et al., "Parallel Needleman-Wunsch Algorithm for Grid", Proceedings of the PAK-US International Symposium on High Capacity Optical Networks and Enabling Technologies (HONET 2005), Islamabad, Pakistan, (Dec. 2005), 6 pgs.

Perer, Adam, et al., "Frequence: Interactive mining and visualization of temporal frequent event sequences.", Proc. Conference on Intelligent User Interfaces. 153-162., (2014), 10 pgs.

Riehmann, Patrick, et al., "Interactive Sankey Diagrams", IEEE Symposium on Information Visualization, (2005), 233-240.

Sebutal, Carlos, et al., "Introduction to computational molecular biology", No. 04; QH506, S4. PWS Pub. Boston., (1997), 308 pgs.

Stasko, John, et al., "Focus+Context Display and Navigation Techniques for Enhancing Radial, Space-Filling Hierarchy Visualizations", IEEE Symposium on Information Visualization, (2000), 13 pgs.

Wang, Gang, et al., "Unsupervised Clickstream Clustering for User Behavior Analysis", Proc. CHI ACM, (2016), 12 pgs.

Wongsuphasawat, Krist, et al., "LifeFlow: visualizing an overview of event sequences", Proc. CHI ACM, (2011), 10 pgs.

(56) References Cited

OTHER PUBLICATIONS

Zhang, Kaizhong, et al., "Simple Fast Algorithms for the Editing Distance Between Trees and Related Problems", SIAM Journal on Computing, 18(6), (Dec. 1989), 1245-1262.

Zhao, Jian, et al., "MatrixWave: Visual Comparison of Event Sequence Data", Proceedings of the SIGCHI Conference on Human Factors in Computing Systems, (2015), 259-268.

* cited by examiner

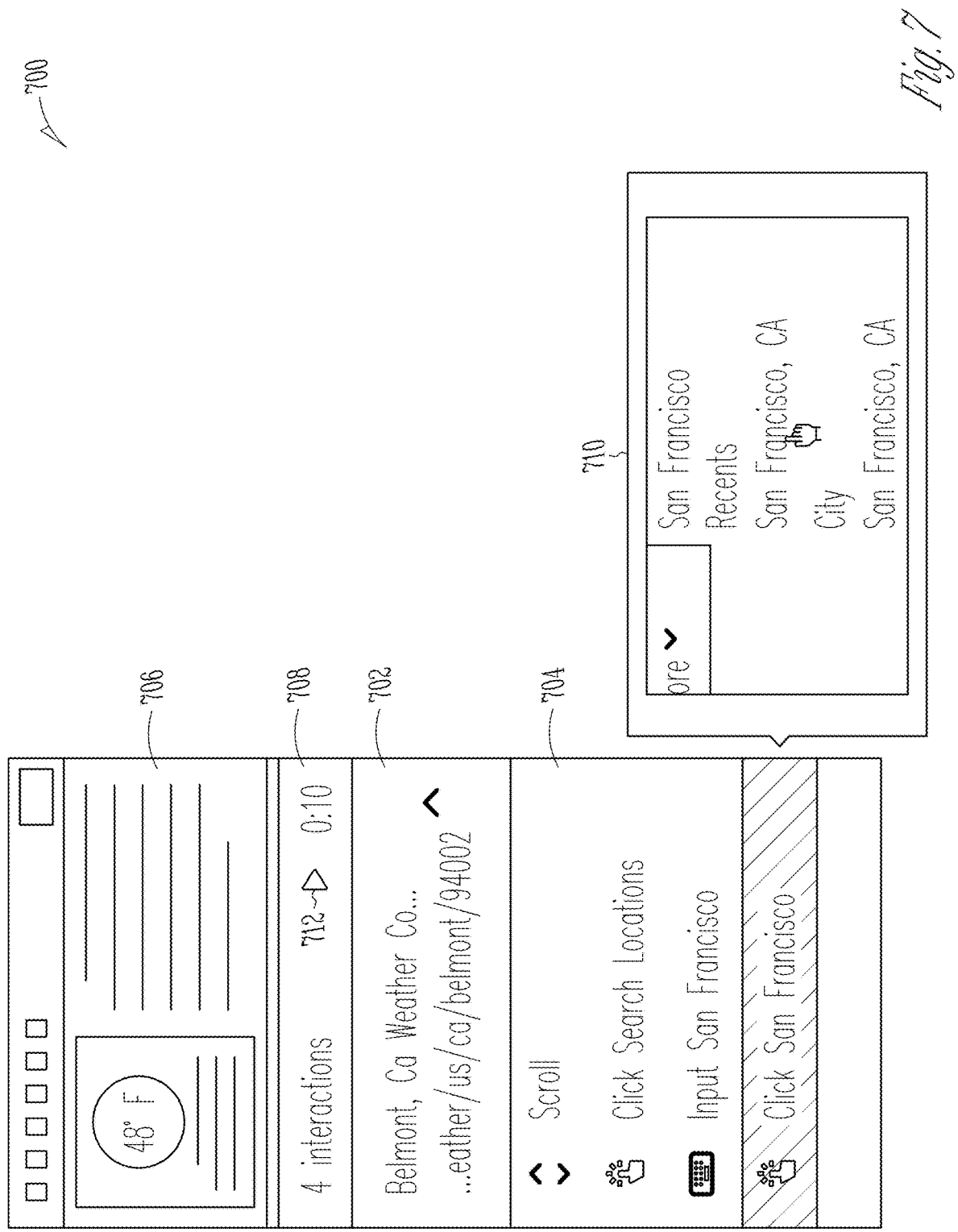

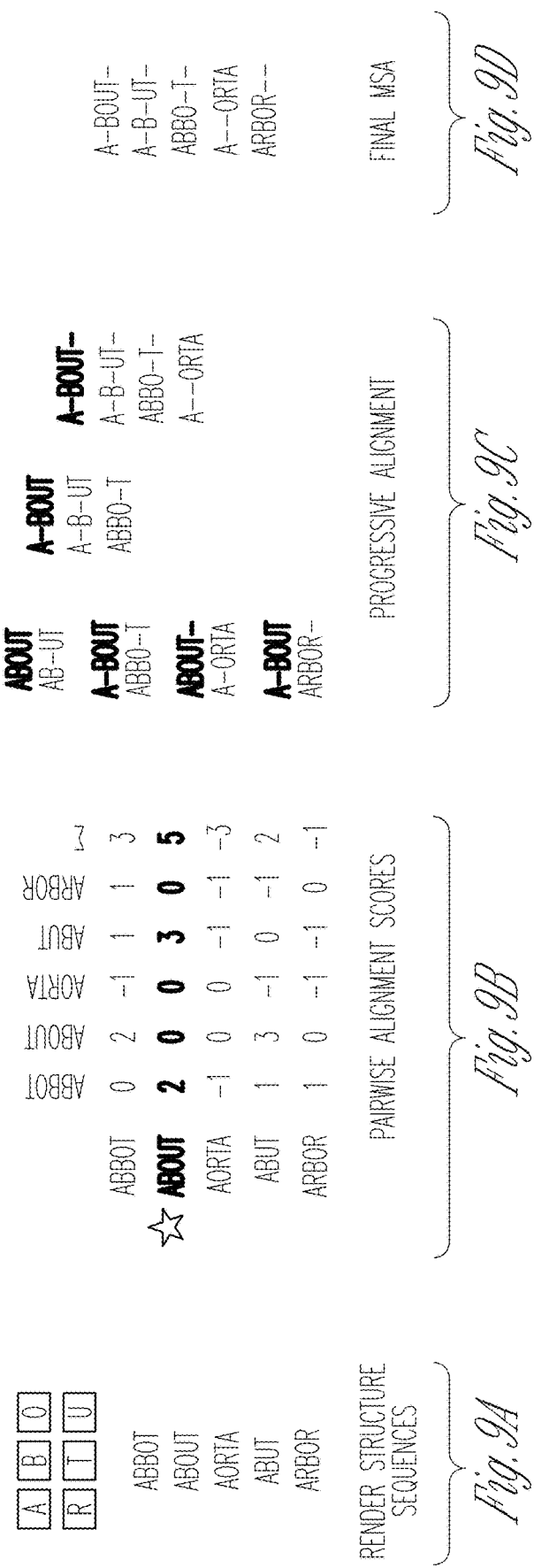

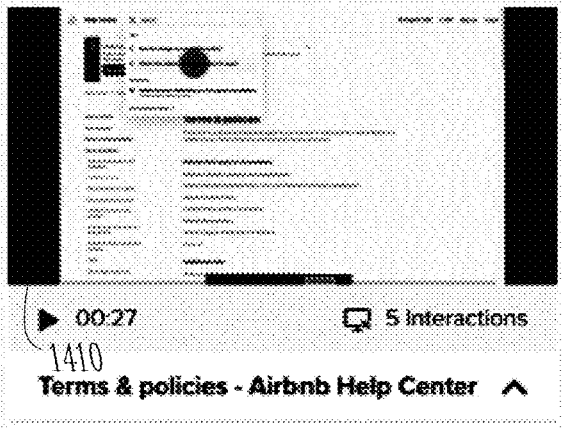
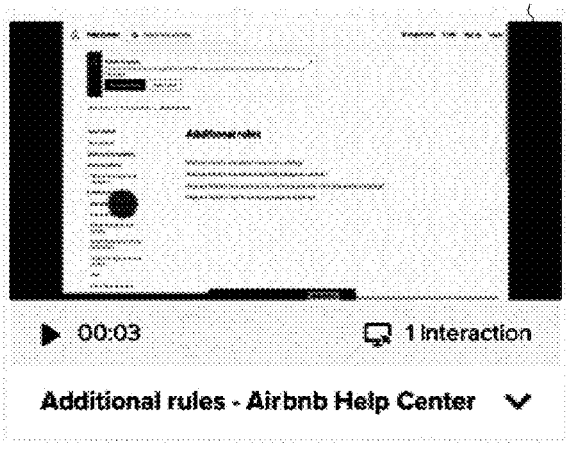
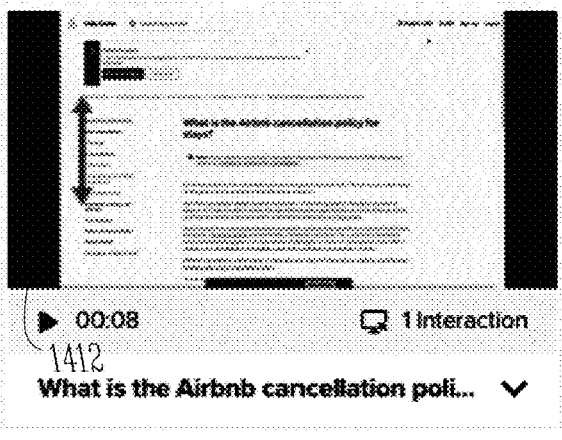
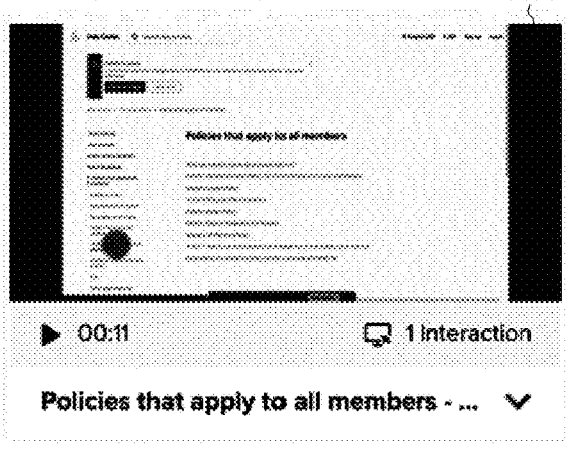
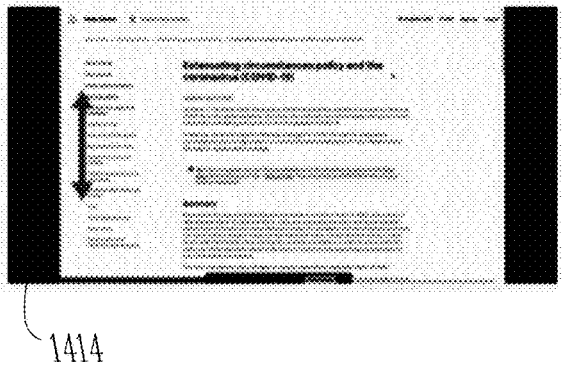
Fig. 13C

ANALYTIC INTERACTIVE VISUALIZATION SYSTEM AND METHOD

CROSS-REFERENCE TO RELATED APPLICATION

This patent application claims the benefit of U.S. Provisional Patent Application No. 63/059,869, filed Jul. 31, 2020, entitled "ANALYTIC INTERACTIVE VISUALIZATION SYSTEM AND METHOD", which is incorporated by reference herein in its entirety.

BACKGROUND

Recordings of a user's digital interactions with a digital asset play an important role in digital experience management. Recorded information can include quantitative information such as the aggregation of data capturing each step a user takes during digital interaction through user interfaces, for example. Recorded information also can include qualitative information such as recordings of a user's interaction experiences, including images presented to a user and a user's recorded verbal commentary, for example. Analyzing these qualitative recordings, particularly when the recordings are in video or audio format, however, often requires an analyst to serially view or listen to each user session and annotate or transcribe it, which can be tedious and time-consuming. Typical quantitative tools, such as clickstream analytics tools, aggregate large amounts of quantitative data across user sessions into funnels representing key user journeys, providing a summary visualization of quantitative data that takes less time to interpret. Constructing these funnels often requires defining event sequences of import in the clickstream, commonly by instrumenting code with semantic event names, or leveraging sequential pattern mining techniques. [20, 24] Analysts can visualize these funnels to quickly identify interaction problems along the clickstream paths, such as segments along the clickstream paths with the highest churn rates. Unlike qualitative data, however, these quantitative analytics do not uncover how the user in the user session experiences the digital interaction and why they experience interaction problems identified in the quantitative analytics. What is needed is a method and system to visually navigate among different users' experiences to compare the experiences in the context of the different user's interactions with a digital asset.

Visualizing Event Sequence Aggregations

There are several visualization techniques that have been useful for presenting aggregations of clickstream paths through digital interfaces. Four popular types of visualizations for presenting aggregate even sequence data are. Sankey diagrams, node-edge diagrams, sunburst charts, and icicle plots. Given a set of event sequences, Sankey diagrams aggregate user journey states (e.g., URLs) across sessions into nodes, and visualize the flows between them [25]. Clickstream analytics platforms often employ Sankey diagrams to highlight common behavioral patterns and outliers.

Other systems use tree-visualization techniques to present aggregated clickstream data. Uber's Maze platform [2] and FP-Viz [13] (frequent pattern visualization) present this data radially as sunburst diagrams [27]. Systems such as LifeFlow [29] and EventFlow [23] employ icicle plots [14]. The CoreFlow [18] system visualizes branching patterns as both icicle plots and node-edge diagrams. Unlike Sankey diagrams, tree-visualization techniques generally do not permit branches to merge back together at a later point in the diagram.

The ZIPT (zero-integration performance testing) platform visualizes aggregate behavioral data from usability studies on native Android apps using Sankey diagrams. Similar to clickstream analytics platforms, the ZIPT platform's Sankey diagrams aggregate events along each interaction step across all sequences. This aggregation strategy produces flow visualizations that increasingly fracture and diverge as the interaction step number increases.

Mining Patterns in Event Sequence Data

The goal of clickstream analytics is often to mine frequently occurring interaction patterns automatically across vast amounts of disparate usage data. Patterns can represent subsequences of consecutive events [21, 22], or lists of ordered—but not necessarily consecutive—events [20, 24]. Systems for clickstream analysis that allow for gaps between events in patterns often leverage sequential pattern mining algorithms. [5, 11]. Other systems use milestones that are either defined by the user [12], or automatically discovered by the system [18] to construct larger patterns.

In clickstream Sankey diagrams and in the ZIPT platform [8], each column often represents a specific interaction step (e.g., "second interaction"). This aggregation strategy produces flow visualizations that increasingly fracture and diverge as the step number increases. For example, suppose there are two interaction sequences that are identical except for an extra interaction in the middle of one of the sequences. The Sankey diagram for these two sequences would diverge into two separate paths after encountering the extra interaction: from that point on, the two sequences would be off by one interaction step.

SUMMARY

In one aspect, a computer-implemented method is provided for presenting commonalities of digital experiences across user interaction sessions with an interactive electronic user interface. Multiple interaction sessions are received at a storage device. Each interaction session includes a sequence of render structures and a corresponding sequence of clusters of user experience information. A computer system is used to produce a corresponding sequence of representative render structures for each user interaction session. Each representative render structure has a sequence position and represents a subsequence of respective render structures of the user interaction session. Each representative render structure determined for an interaction session is associated in a memory device with a different cluster of user experience information from the interaction session. Structurally matching render structures within different sequences of representative render structures are determined, based at least in part upon similarity among the render structures within the different sequences of representative render structures. Adjusted sequence positions are produced for one or more of the representative render structures by inserting one or more gap positions between sequence positions in one or more of the sequences of representative render structures to align sequence positions of one or more structurally matching representative render structures within different sequences of representative render structures. Multiple node indicators are displayed on an electronic display screen, each node indicator having a sequence position corresponding to an adjusted sequence position of one or more matching representative render structures within the adjusted sequences of representative render structures. In response to receiving a user selection at a respective node indicator, user experience information is displayed from each cluster of user experience information associated in the memory device with a representative render structure having an adjusted sequence position that matches the sequence position of the selected node indicator.

In another aspect, a digital experience management system includes a memory operably coupled to the processing circuitry, that stores multiple session information structures. Each respective session information structure including multiple sequentially ordered user experience interface cards, each user experience interface card having a sequence position that matches a sequence position of a node indicator. The memory stores instructions which, when executed cause the processing circuitry to display on an electronic display screen a plurality of sequentially ordered node indicators, each node indicator having a respective sequence position. The memory stores instructions to cause the processor to respond to a user selection of a respective node indicator, by displaying on the electronic display screen, each respective user experience interface card having a sequence position that matches a sequence position of the respective selected node indicator.

DESCRIPTION OF THE DRAWINGS

The patent or application file contains at least one drawing executed in color. Copies of this patent or patent application publication with color drawing(s) will be provided by the Office upon request and payment of the necessary fee.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 7 is an illustrative drawing showing an example user experience interface card image for presentation on a computing device display screen.

FIG. 9A is an illustrative drawing showing a set of representative render structures and showing multiple representative render structure sequences.

FIG. 9B is an illustrative drawing representing a pairwise alignment scoring process.

FIG. 9C is an illustrative drawing representing a gap insertion process.

FIG. 9D is an illustrative drawing representing a final alignment of representative render structures.

FIGS. 12A-1, 12A-2 are illustrative drawings showing an example Sankey diagram in which user experienced events are displayed in a first panel region in response to an analyst's selection of a node indicator.

FIGS. 12B-1, 12B-2 are illustrative drawings showing an example Sankey diagram in which a subset of the user experienced events are displayed in the first panel region and in which other user experience events are filtered out.

FIG. 13C is an illustrative drawing that shows images of multiple example cards displayed in response to an analyst interacting with a heat map region of FIG. 13B.

DETAILED DESCRIPTION

Overview

Figure 1:
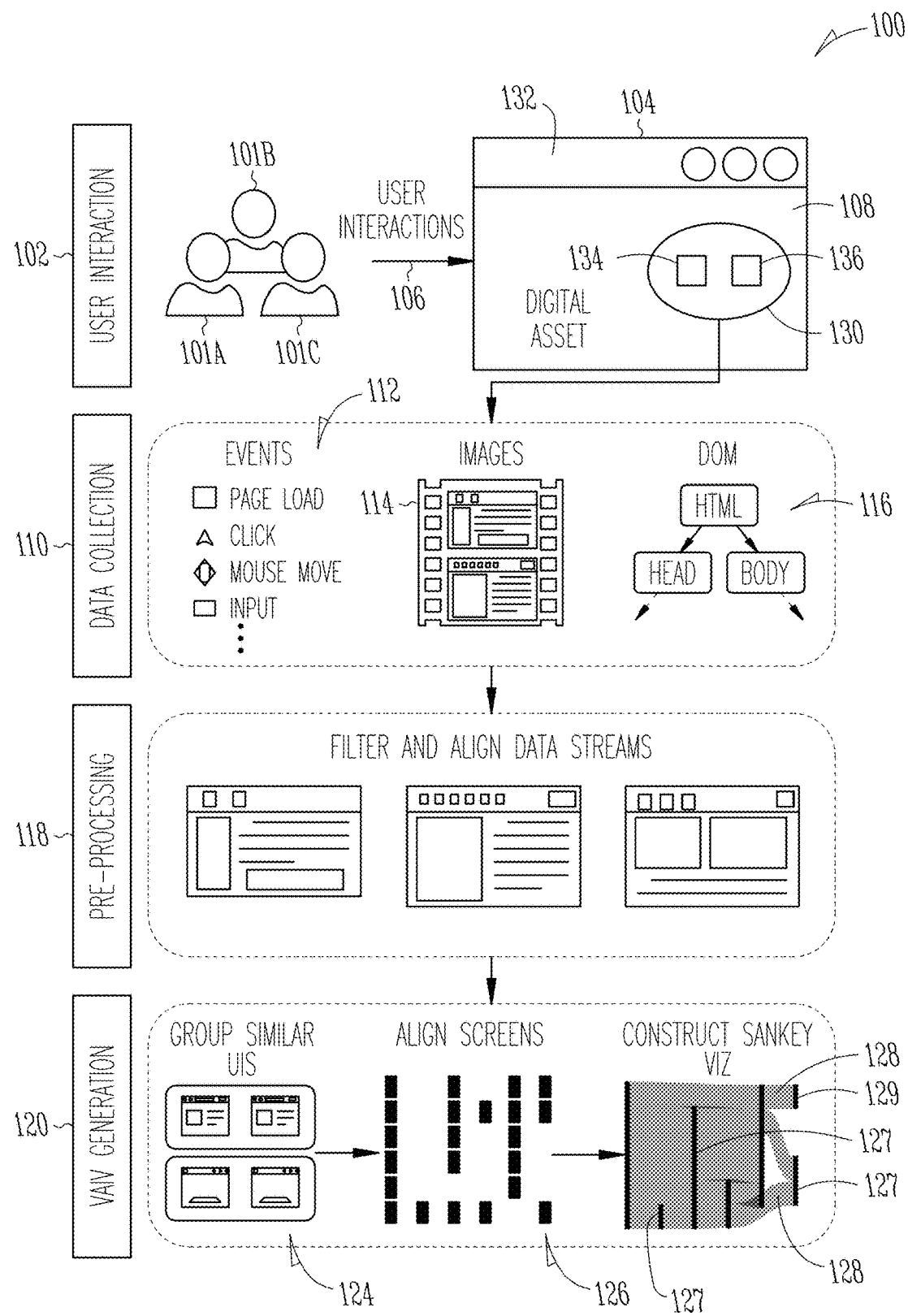
FIG. 1 is an illustrative drawing representing an example overview representation of a process to present commonalities and anomalies of digital experiences across multiple user interaction sessions with a digital asset.

The inventors have developed a computer-implemented system to identify common and anomalous patterns of interaction experience of different users in the context of their interaction with a digital asset. As used herein, the term 'digital asset' refers to a user interface that includes render elements, such as a DOM tree data for example, used to render user interactive elements with which a user interacts. The user interactive elements can include visual elements, audio elements, haptic elements, or other sensory elements, for example. The inventors use computer-implemented sequence alignment techniques to arrange sequences of data from different user interaction sessions with a digital asset to identify interaction pattern similarities across sessions and to identify interaction pattern anomalies across interaction sessions, based upon users' interaction experiences. In an example system, a sequence alignment technique commonly referred to as a 'star alignment' is employed to align multiple sequences of user visual interaction experience data, in the form of user experience interface card images, which presented in the context of a Sankey diagram. Computational biologists have commonly used sequence alignment techniques to identify preserved structures in DNA and protein sequences with shared evolutionary ancestry. [26]

An example computer system is configured to generate on a display screen, an interactive user interface, also referred to as a analytic interactive visualization (AIV) interface, that aggregates visual experience data received from multiple user interaction sessions with a digital asset for use to evaluate user interaction experience with one or more digital assets, such as webpages or mobile applications, for example. The AIV interface can be used by an analyst to visualize patterns in the interaction experiences of users of the digital assets, and drill down into common sessions or individual sessions to access more detailed information received during the sessions. The computer system is configured to generate an AIV interface instance based upon data received during the sessions, such as events, images, videos, and audio recordings of the session, and render structures from the sessions.

The AIV interface includes an interactive visualization, for example in a form such as a Sankey diagram with nodes that correspond to user experience interface card images that represent users' interaction experiences during interaction with a digital asset. A Sankey diagram provides a type of a visualization commonly used to depict a flow from one set of values to another. A Sankey diagram shows connections among items often referred to as nodes. The connections between nodes in a Sankey diagram are referred to as edges. Sankey diagrams are commonly used to show a many-to-many mapping between two domains or multiple paths through a set of stages.

An example AIV interface aligns Sankey nodes with users' interaction experiences. User experiences can involve images, events, audio or other sensory elements presented during their interaction with a digital asset. The AIV represents discrete user experiences during interaction with a digital asset as interface cards. Each interface card includes machine readable code to cause a computing device to display one or more images and/or one or more events and/or one or more sounds and/or one or more other sensory elements. The AIV represents sequences of user interaction experiences during interaction with a digital asset as interface card sequences. The AIV operatively aligns Sankey nodes with interface cards. An interface card can be shared by users determined to have had a matching interaction experience during their interactive sessions with a digital asset. The AIV operatively aligns Sankey edges with interface card sequences. The AIV interface display includes multiple node indicator regions that are operative when selected, to drill-down to individual interface cards. The AIV interface display includes multiple session indicator regions that are operative when selected, to drill-down to an interface card sequence.

FIG. 1 is an illustrative drawing representing an example of an overview representation of a process 100 to present commonalities and anomalies of digital experiences across multiple digital user interaction sessions with a digital asset 108. A processor circuit 1802 is specially configured according to computer executable code to cause an example server computer system 1800 shown in FIG. 18 to present commonalities and anomalies of digital experiences according to the process 100. The example process 100 includes multiple component processes. During a user interactions component 102, one or more user computer systems 104 are configured to receive user input 106 and to capture information during user interactions by multiple users 101A, 101B, 101C with a digital asset 108 such as, for example, an electronic user interface to a webpage or to a mobile application. The user interaction sessions may be 'directed' or 'undirected'. A directed user interaction session typically requires users to attempt an identical or a similar set of tasks in an identical or a similar order. During a directed version of the user interaction session component 102, for example, users 101A, 101B or 101C may be presented with the digital asset 108 and also with a series of tasks to accomplish using the digital asset 108. An example directed user interaction session includes tasks such as: (1) open a particular e-commerce website, (2) show how you would you search for a pair of black shoes, (3) describe (perhaps audibly) how satisfied you are with the results, (4) determine what to do next if you wanted to buy a pair of shoes. The user interaction component 102 generates raw user experience data, which is indicative of a user's experience during a user interaction session. The user experience data can include, for example, video display screen images 114 and render structures 116 used to render the screen images 114, events 112 generated in response to user input or system input to the digital asset 108, and audio produced by a user or the system. A collection component 110, which operates contemporaneous with the user interaction component 102, captures and stores the screen images 114, render structures 116, events 112, and audio to a computer readable storage medium. A preprocessing component 118, filters the data and aligns matching user experience data, which includes display screen images from different user interaction sessions. A visualization component 120 generates an AIV interface instance 129. Generating an example AIV interface instance 129 involves grouping similar screen images 124 captured during different user interaction sessions, temporally aligning two or more similar screen images 126 captured during different user interaction sessions, and producing an interactive Sankey diagram 129, to include nodes 127 that correspond to screen images and edges 128 between nodes 127 that indicate the sequences of screen images received by different users during different user interaction sessions.

Data Capture

Figure 2:
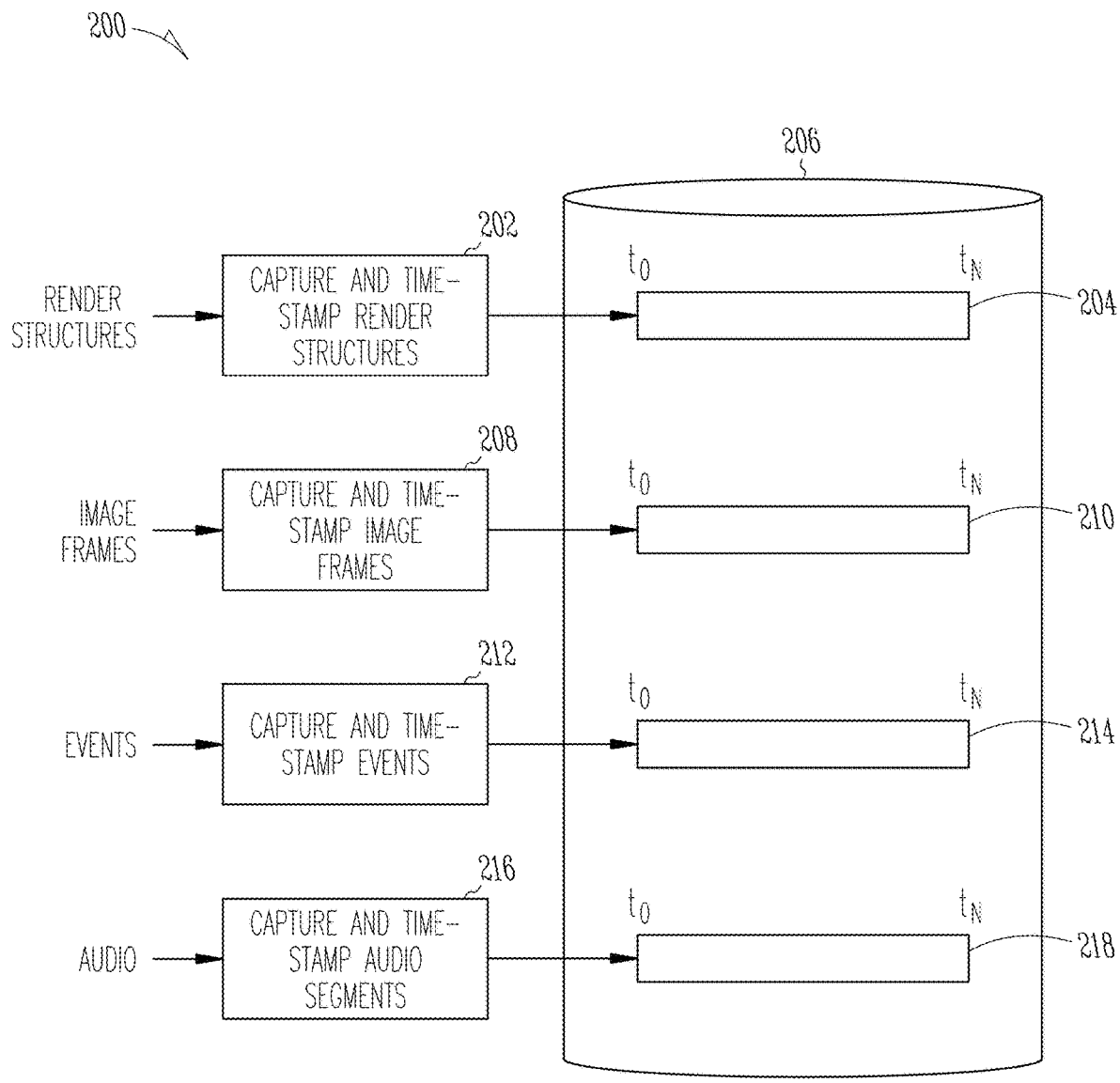
FIG. 2 is an illustrative functional flow diagram representing an example data capture process.

FIG. 2 is an illustrative functional flow diagram representing an example data capture process 200. A user computer system 104 includes processor circuitry 1802 and a storage device 104, 106 that includes code executable by the processor to configure the computer system to perform the operations of the process 200. FIG. 1 shows an example computer processing system architecture in which to implement a user computer system 104. Operation 202 captures and time stamps render structures 116 received during a user interaction session 102. As explained below, an overall render structure (e.g., a Document Object Model (DOM) tree data structure) is received once, and thereafter during a user interaction session, incremental render structure changes (e.g., the 'delta') are received. Operation 202 timestamps the received render structure changes. Operation 202 stores the time stamped render structures 116 as a chronologically ordered render structure sequence 204 in a computer readable information storage device 206. Operation 208 captures and time stamps image frames 114 (e.g., video image frames), camera image frames (e.g., an image of the user's face). produced using the render structures, and stores them as a chronologically ordered image frame sequence 210 in the computer readable information storage device 206. Operation 212 captures and time stamps events 112 and stores them as a chronologically ordered event sequence 214 in the computer readable information storage device 206. Operation 216 captures and time stamps audio segments and stores them as a chronologically ordered audio segment sequence 218 in the computer readable information storage device 206. An example interaction session occurs during a time interval $t_0$ to $t_N$. Render structures, image frames, events, and audio segments that occurred at matching times during an interaction section are chronologically aligned within the sequences 204, 210, 214 and 218 based upon matching respective capture time stamps.

Referring again to FIG. 1, during the user interaction and data collection components 102, 110 in an example system, a browser recorder extension 130 is used to capture user interaction and user experience elements such as screen images, screen recordings and audio, such as a user's voice, events and render structures at one or more user computing systems 104. URLs displayed on screen images also can be captured. Alternatively, an app can be downloaded to capture this information. An event can be a user event, which is initiated by a user action or a system event that is initiated by the user's computer system. Still referring to FIG. 1, for example, a user may "click" on a link that triggers an event such as a "page load" that causes a new page to be displayed in a computer's browser 132. In this example, there is both a user event (the click) and a system event (the page load). Both events are captured. For websites, an example user interface (UI) render structure includes a Document Object Model (DOM) tree data structure 117 that describes the visual image components and how they are laid out on a computing device display screen 1520. For an example mobile device, an example render structure includes a view hierarchy data structure (not shown) that describes the visual image components on a display screen and how they are laid out on a device display screen. The browser extension 130 may provide a basic UI (not shown) for a user to start and stop the data collection during an interaction session with one or more digital assets 108. Apart from the UI, the example browser extension 130 includes two primary parts: a content script 134 that is injected into the render structures 116 to render the digital assets to configure the user computer system 104 to record event and render structures during page loads, for example; and a background script 136 that runs at a global browser level. The background script 136 configures the user computer system 104 to keep track of page loads, injects the content script into the render structures 116, for example, and handles recording of screen images 114. An example browser extension 130 records screen images at a rate of ten (10) image frames per second to produce a motion picture sequence that represent a user's interaction experiences with an interface under test. An example browser extension uses the browser's desktop capture API to capture data. The browser extension sends the captured data over a network to a server system for preprocessing and presentation.

The example browser extension 130 collects user and system events by registering appropriate event listeners in window and document objects of render structure. To capture a render structure (e.g., a DOM) and to capture changes in the render structure over time, the content script 134 configures the computer system to initially traverse a render structure (e.g., a DOM tree), starting at a document node, and to record a render structure events (e.g., a DOM events) with this data. The example browser extension 130 registers a MutationObserver [4] to listen to changes in the render structure.

The browser extension 130 collects an event stream that includes both user interactions (e.g., clicks, scrolls) as well as system-level events (e.g., page loads, form submit). For each event, the browser extension 130 captures the event type and a timestamp of when the event occurred. Additional attributes are captured depending on the event type. The following types of events are captured, for example: click, mousemove, input, scroll, nodescroll, dimensions, formsubmit, urlchange, focus, and blur.

Some of the events that the browser extension 130 records—specifically scroll, mousemove, and dimensions, for example,—can be fired at a high rate by the browser. This can lead to a large number of redundant events being captured. However, data at the granularity if recording every redundant event is not required. To avoid recording unnecessary event data, the browser extension 130 "debounces" these events, which essentially involves recording only the first and last events out of a series of similar events firing continuously.

In an example user computer system 104 in which a render structure is implemented as a DOM, the DOM is captured in a tree structure that naturally resembles the browser's 132 representation of the DOM. The browser extension 130 captures for each DOM node, a node type, tag, attributes, and bounds. Moreover, browser extension 130 timestamps each piece of captured data to support chronologically matching of event data, DOM tree data, image data, user generated audio data and URL data. Furthermore, for example, for each node in a captured DOM tree, data representing a visual bounding box on the screen also is captured, as well as render-time CSS (cascading style sheets) properties. The bounding box data and the CSS properties are used, for example, to determine whether or not a captured DOM element actually was visually presented on a display screen at a time increment corresponding to a given time stamp. Each DOM node is assigned an id, and also linked to a list of child nodes if they have any. Since most websites have many nodes in a DOM, the entire DOM is not downloaded after every change in a screen image. Instead the complete DOM capture happens only once, when a page is loaded. After that, only changes in the DOM are captured—e.g., DOM nodes that were added, removed, and modified.

The example browser extension performs a two-step image extraction process. First, a motion picture frame (e.g., a video frame) is extracted using an event timestamp by comparing its timestamp to a timestamp at which the motion picture capture started. Second, the captured image is cropped to show just the browser viewport, e.g., only the area of a web page visible to a user, using viewport bounds data. Since an example computer system 104 records the entire displayed content on a display screen of a user's computing device, the captured image is cropped to only include only the browser viewport and to eliminate other display items that are not relevant (e.g., windows from other apps) in case the user had not maximized the browser window while performing a user interaction session.

Data Filtering to Identify Chronological Moments

Figure 3:
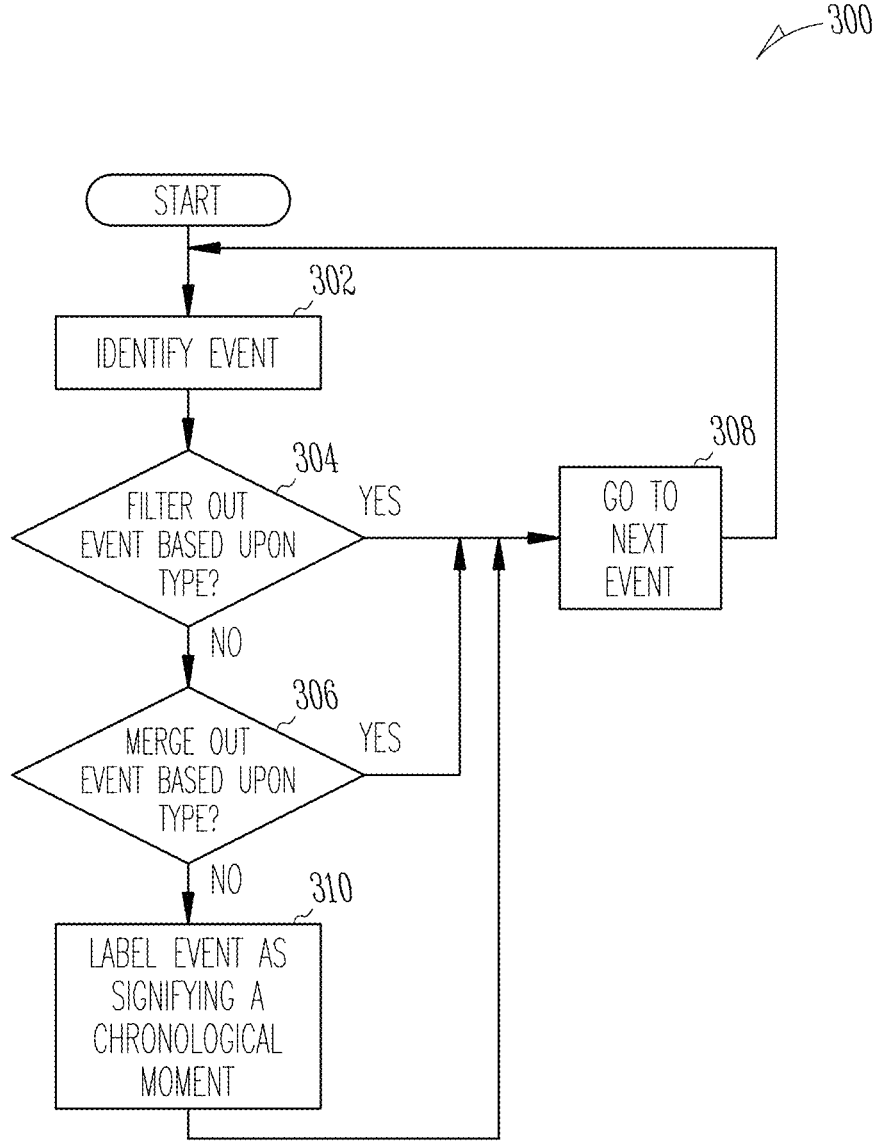
FIG. 3 is an illustrative functional flow diagram representing an example data filtering process.

FIG. 3 is an illustrative functional flow diagram representing an example data filtering process 300. A server computer system 1800 includes processor circuitry 1802 and a storage device 1804, 1806 that includes code executable by the processor to configure the server computer system to perform the operations of the process 300. Operation 302 searches the chronologically ordered event sequence 214 for a next event in chronological order. Decision operation 304 determines whether to filter out a currently selected event based upon event type. Events are filtered out that can trigger a significant change in the page, such as a page load event, or form submit event, for example. Decision operation 306 determines whether to merge a currently selected event based upon event recurrence. For example, some types of 'input' events and 'scroll' events that occur in quick sequence are merged together since the other in between occurrences of the event do not add meaningful information. An example merging process results in only the first and last occurrence of an event in a sequence of such events being retained. The other recurrent events in the sequence are filtered out. In response to decision operation 304 determining to filter out an event, control flows to operation 308 which selects a next chronological event and provides the event to operation 302 for identification. Similarly, in response to decision operation 306 determining to merge an event, control flows to operation 308 which selects a next chronological event and provide the event to clock 302 for identification. In response to decision operation 302 determining to not filter out the event and decision operation 304 determining to not merge the event, operation 310 labels the event as signifying a chronological moment. As explained with reference to FIG. 7, user experiences such as, events, screen images and audio segments associated with chronological moments are presented in user experience cards that can be accessed with an AIV interface to provide drill-down insights into user experience during a user interaction session.

Render Structure Similarity Matching

Figure 4:
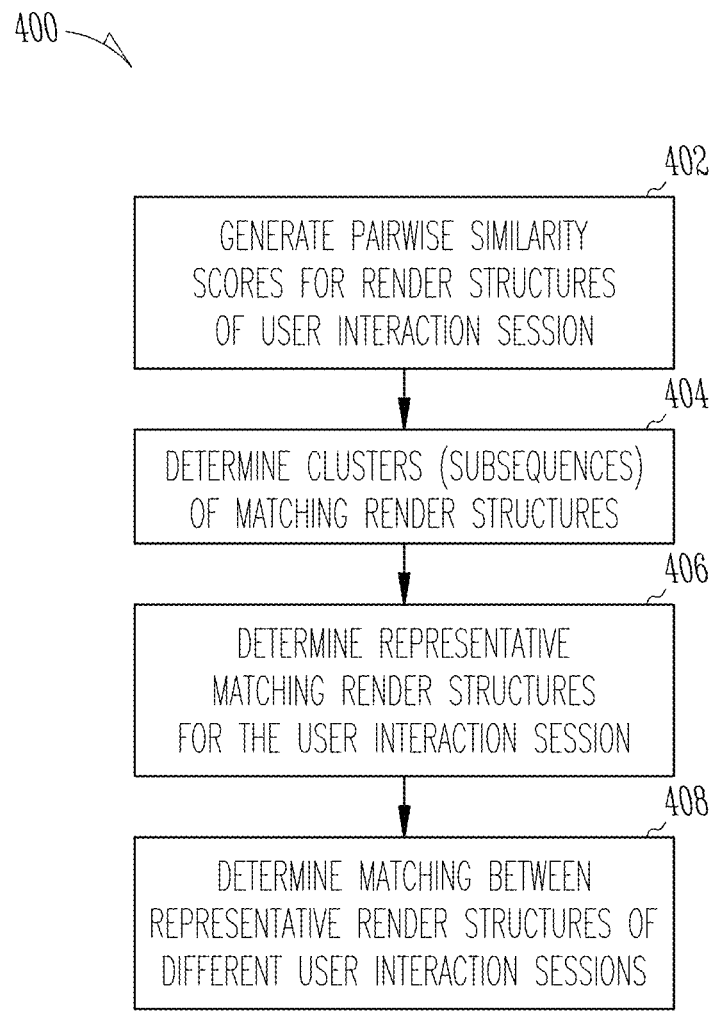
FIG. 4 is an illustrative functional flow diagram representing an example render structure cluster identification and similarity matching process.

FIG. 4 is an illustrative functional flow diagram representing an example render structure cluster identification and similarity matching process 400. A server computer system 1800 includes processor circuitry 1802 and a storage device 1804, 1806 that includes code executable by the processor to configure the server computer system to perform the operations set out in the process 400. Operation 402 generates pairwise similarity scores for pairs of render structures within a render structure sequence 204 for a user interaction session. Operation 404 identifies clusters subsequences of matching render structures based upon pairwise similarity scores. Operation 406 determines a representative render structure for each render structure subsequence cluster. In an example server system, a render structure from within a subsequence cluster is selected as the representative render structure for the cluster subsequence. Operation 404 identifies a sequence of representative render structures for each of multiple user interaction sessions. Thus, operation 406 identifies a sequence of representative render structures, each representative render structure representing a render structure subsequence cluster. Operation 408 determines matches between different sequences of representative render structures based upon the pairwise similarity scores of the representative render structures of the different sequences of representative render structures.

In an example server system, render structure similarity is determined based upon comparison of similarity of render structures within render structure sequence 204. In an example similarity process 400, render structure similarity can be determined based both upon render structure composition and based upon render structure origin (e.g., based on a URL). It will be appreciated that screen image content (e.g., pixels) ordinarily is not relevant to a render structure similarity determination. Content-agnostic heuristics/metrics techniques have been used in the past [15][7]. In an example system, render structure similarity is determined based upon similarity of visible render structure elements that are visible within a screen display image. Render structures representative of a screen images are determined based upon portions of the render structures (render structure elements) that are visible in screen image. It will be appreciated that different render structure elements are visible in different screen display images. Visible render structure elements are computed for each render structure by comparing bounds of all render structure elements (e.g., DOM elements) to the browser viewport bounds. In an example system, for pair-wise comparison of render structures, these sets of visible render elements are compared based on render structure element attributes such as id, class names, tags and tree structures, for example.

More particularly, in an example system, render elements include DOM nodes and render structure similarity is measured by flattening render structure DOM hierarchies into collections of flat DOM nodes and comparing the flattened DOM node collections. In another example system, tree mapping algorithms are used to compare render structures based upon DOM nodes and their hierarchical 'tree' relationships.

Referring to both FIG. 4 and to FIG. 8A, which is explained more fully below, operations 402 and 404 produces a chronologically ordered subsequence clusters $SUB_A$, $SUB_B$, $SUB_O$, $SUB_U$ and $SUB_T$. In an example server system, each cluster, $SUB_A$, $SUB_B$, $SUB_O$, $SUB_U$ and $SUB_T$, is a chronologically ordered subsequence of captured render structures determined to be similar. Still referring to FIG. 8A, operation 406 determines a representative render structure for each of cluster subsequences $SUB_A$, $SUB_B$, $SUB_O$, $SUB_U$ and $SUB_T$. Thus, for example a representative matching render structure 'A' is determined for the sequence of similar render structures $SUB_A$. A representative matching render structure 'B' is determined for the sequence of similar render structures $SUB_B$. A representative matching render structure 'O' is determined for the sequence of similar render structures $SUB_O$. A representative matching render structure 'U' is determined for the sequence of similar render structures $SUB_U$. A representative matching render structure 'T' is determined for the sequence of similar render structures $SUB_T$. The representative render structures A, B, O, U and T are ordered chronologically in the same chronological order as cluster, $SUB_A$, $SUB_B$, $SUB_O$, $SUB_U$ and $SUB_T$.

Referring to both FIG. 4 and to FIGS. 9A-9D, for example, which is explained more fully below, operation 408 uses the similarity matching process to match similar representative render structures occurring within different interaction sessions in the course of the process of sequentially aligning matching representative render structures occurring across the different interaction sessions. For example, similarity matching is used to match similar representative render structures labeled as 'A' occurring within sequences ABBOT, ABOUT, AORTA, ABUT and ARBOR in the course of alignment of the representative render structures in these sequences. Based upon matching of representative render structures across different sequences as determined by the matching operation 408, a sequence alignment process described below with reference to FIGS. 9A-9C is used to align matching representative render structures at matching sequence positions in different sequences. Thus, for example, as shown in FIG. 9D, sequence position of a render structure 'B' is adjusted to be in a third sequence position in an adjusted render structure sequences, A-BOUT, A-B-UT-, ABBO-T- and ARBOR-.

Render Structure Example

Figure 5:
FIG. 5 is an illustrative drawing showing an example code fragment.
Figure 6:
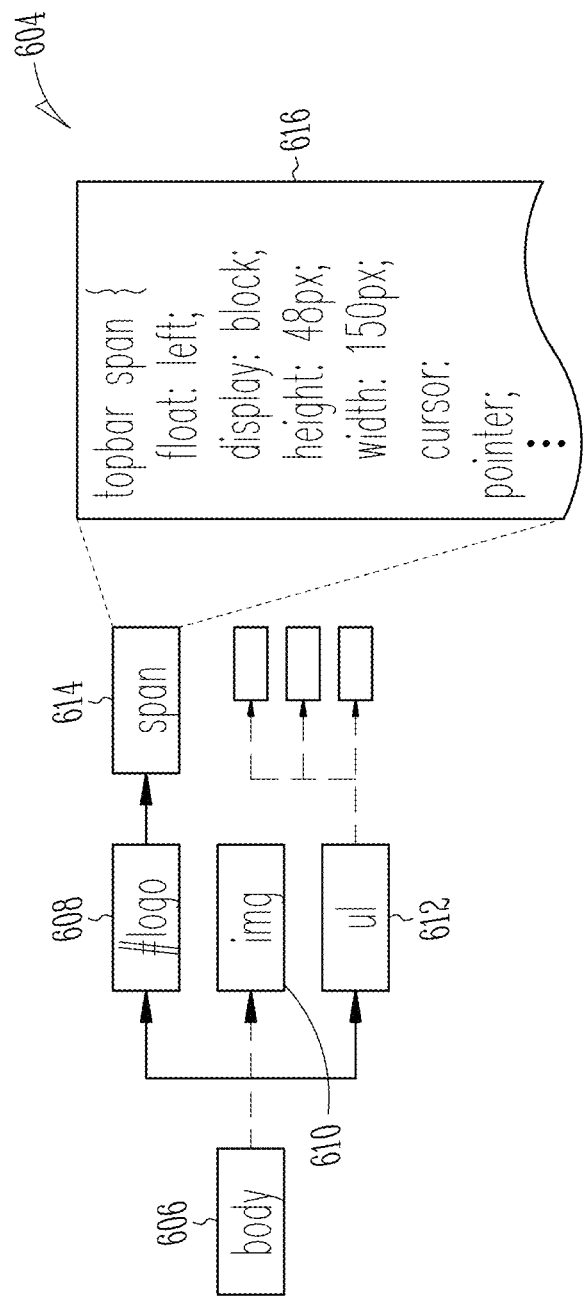
FIG. 6 is an illustrative drawing showing an example render structure corresponding to the code fragment of FIG. 5.

FIG. 5 is an illustrative drawing showing an example HTML code fragment 602. FIG. 6 is an illustrative example render structure 604 corresponding to the code fragment of FIG. 5. The example render structure 604 includes a DOM that includes a tree structure in which a "body" element 606 is a root having as children, a "#logo" element 608, an "img" element 610 and a "ul" element 612. The "#logo" element 608 has as a child element, the "span" element 614. Each element in the DOM includes computer executable code that comprises CSS render time properties of the element. Example code 616 of the "span" element 614 is shown. It will be appreciated that each element in the DOM tree is associated with code, although codes are hidden for all but the "span" element 614, to reduce complexity of the DOM representation. Render structure similarity for a pair of DOM-type render structures is determined based upon similarity of code within the render elements of the pair. In measuring similarity of render structure tree structures, for example, a determination is made as to whether matching structural elements of a DOM tree also have matching parent elements and/or matching child elements, for example. Moreover, in an example process 400 measuring similarity of render structure tree structures can be determined by mapping DOM tree structure. Thus, in an example similarity process 400, the DOM tree elements and/or DOM tree structure can be used as an indication of similarity of a pair of render structures. Similar similarity determinations can be made for elements of a view hierarchy.

During a user interaction session, the render structures can change in response to a user action or system action in small ways or in large ways. For example, a user may provide input such as opening a pull-down menu or adjusting a control button that causes a small render structure change that causes a corresponding change in screen image. The similarity process 400 can determine that render structures with small changes between them still match despite the differences. Alternatively, for example, a user may provide input during a user interaction session causing a system to perform a page load, which causes a significant render structure change used to significantly change the screen image. With a large render structure change, an example similarity process will indicate that render structures captured before the large render structure change do not match render structures captured after the large render structure change.

In an example server system, the similarity process selects a similarity metric that is effective in accurately identifying clusters of recorded render structures wherein for each cluster render structures within the cluster are more similar to one another than to render structures not included within the cluster. In an example system implementation, a render structure metric requires at least 50% similarity between a pair of render structures to determine that the render structures are match. However, selection of a similarity metric ordinarily is context dependent. The different characteristics of different user interfaces under test can require selection of different similarity metric requirements.

Render structure similarity also is determined in part based upon render structure origin. For example, a webpage typically is associated with a URL that includes a backslash ("/") followed by a text string. Some URL text stings provide information as to the source of a webpage, which also can be factored into a similarity comparison. In an example server system, each respective render structure is associated with a respective URL. During a similarity determination process, URLs of pairs of render structures are compared. A determination that the URLs associated with a pair of render structures include matching text stings is used as an indication of the similarity of the pair. Thus, similarity of render structure origins can be used to measure whether the render structures match.

User Experience Interface Cards

FIG. 7 is an illustrative drawing showing an example user experience interface card 700 for display on a computing device display screen 1520. An analyst can use the user experience interface card to access information about user experience during a user interaction session with a digital asset. (To avoid confusion, the term 'analyst' is used to refer to an analyst using the interactive visualization system, and the term user is used to refer to a person whose experiences are recorded while interacting with a digital asset.) The server computer system 1800 includes processor circuitry 1802 and a storage device 1804, 1806 that includes code executable by the processor to configure the server computer system to display the example user experience interface card 700. A user experience interface card provides access to user experience information about a respective user interaction session that is chronologically aligned with a corresponding representative render structure from the user interaction session. More particularly, an example user experience interface card provides a user interface to access user experience information such as event, image and audio information that is chronologically aligned with a representative render structure of the user interaction session.

Referring to FIG. 7, the user experience interface card (hereinafter "the card") includes a user interaction session identifier field 702, an events menu 704 that provides event indicators, a motion picture display window 706 and a display control field 708. The card also includes a 'tooltip' extension 710 that that is displayed when an analyst hovers/mouse-overs a selectable menu item in the events menu 704. The tooltip extension 710 displays images relating to a user-indicated selected menu item. The user interaction session identifier field 702 provides information about the user interaction session for which the card 700 acts as a drill-down interface. A selectable up-arrow can be selected to show more information about the session. A down arrow (not visible) can be selected to show less. An events menu 704 provides a selectable list of event indicators identified as chronological moments within the user interaction session identified in identifier field 702, for which the card 700 acts as a drill-down interface. The display window 706 displays short image sequences (e.g., video clips or slideshows), in response to analyst's selection of events in the events menu 704, captured for the identified user interaction session. The display control field 708 includes a selectable image sequence selector arrow 712 to start and stop play of an image sequence in the display window 706. Actuating the selector causes change between image sequence play/stop states. A motion picture selection indicator 708 indicates the number of different motion picture image sequences available. In this illustrative example, the "4 interactions" notification indicates that an image sequence is provided for each of the four events in the events menu 704. The display control field 708 includes an indication "0:10" that indicates a time-length of a currently selected motion picture clip (i.e. 10 seconds).

In operation, an analyst selects an event item listed in the events menu 704. For example, an analyst may select an event by hovering a pointing device over an event menu item. In response to the user selection of an event, the menu item becomes highlighted and a 'tooltip' extension 710 is displayed. The menu item "Click San Francisco" is highlighted in the example card 700 and an image is displayed in the display window 706 that has a timestamp that matches a timestamp of the selected event in the event menu 704. An analyst actuates the selector 712 in the display control field 708. In response to the analyst actuating the selector 712, a ten-second-long image sequence plays in the display window 706 that chronologically corresponds to the selected event menu item.

In an example system the image sequence plays in a picture-in-picture video playback that is handled using a standard HTML video element which is hidden except in picture-in-picture mode. When an analyst selects an event and actuates the selector in the display control field 708 of the screen card 700, a video source is set to a video for a corresponding user interaction session, and a video is searched for that has a timestamp that corresponds to a timestamp of the selected event. A picture-in-picture display mode is automatically enabled to play the video within the display window 706. When an analyst closes the picture-in-picture, video playback is also stopped. As will be appreciated from the explanation above, the visual image card 700 of FIG. 7 provides a drill-down to events and screen images that have timestamps that match the timestamp of a representative render structure for which the card 700 acts as a drill-down interface. Thus, the motion picture displays a screen image sequence that was displayed to a user at the time of the event. An analyst can observe the event and the corresponding screen image sequence to gain insight into the experience of a user. Additionally, chronologically aligned audio information (not shown) corresponding to an event also can be provided so that an RX analyst can hear what a user said at the time of the event to gain further insight into user experience.

The example user experience interface card 700 of FIG. 7 identifies four events: a scroll event, two click events and an input event. Each of these four events was identified as chronological moment. Each of these four events has a timestamp that is chronologically aligned with the timestamp of the representative render structure for which the card 700 acts as an interactive drill-down interface. The four motion picture clips viewable within the display window 706 that correspond to the four events also have timestamps that are chronologically aligned with the timestamp of the representative render structure for which the card 700 acts as a drill-down interface. Thus, the card 700 provides a drill-down interface in which an RX research can gain insights by observing multiple events and multiple corresponding image sequences chronologically aligned with the representative render structure for which the card 700 acts as a drill-down interface.

Figure 8A:
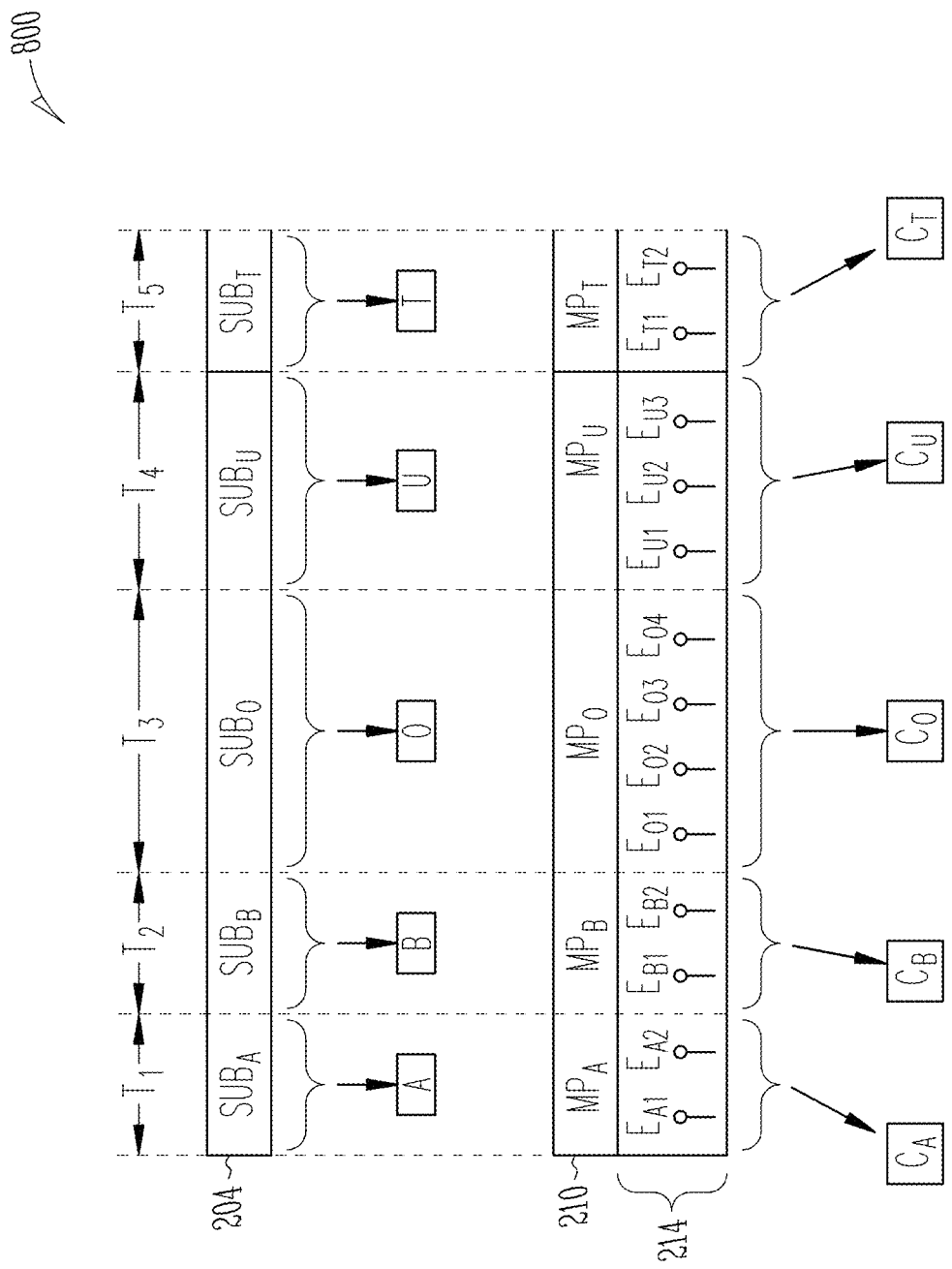
FIG. 8A is an illustrative example session information structure.
Figure 8B:
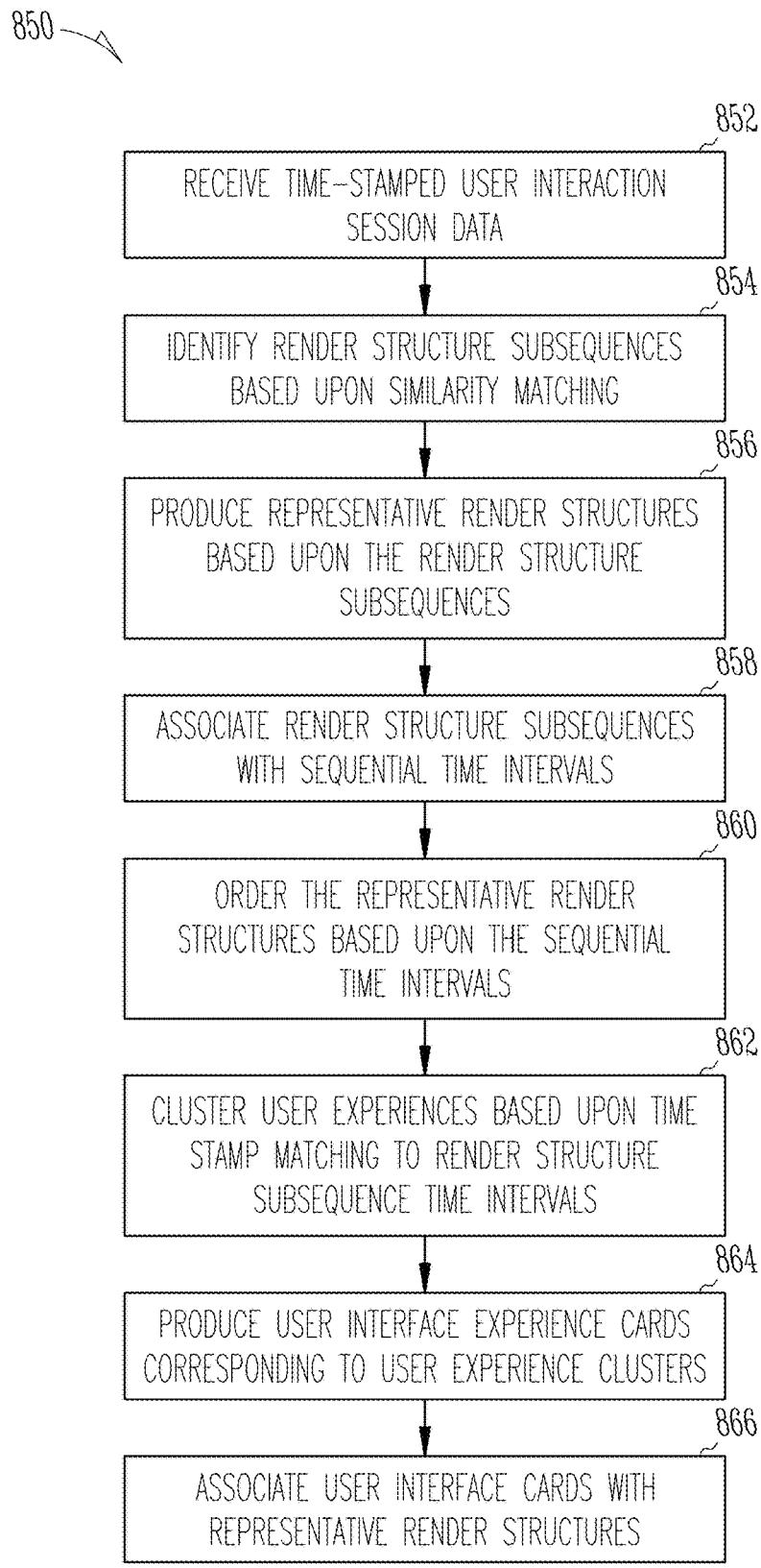
FIG. 8B is an illustrative flow diagram representing a process to improve performance of a computer-based interactive visualization system.

Correspondence Between Representative Render Structures and User Experience Interface Cards FIG. 8A is an illustrative diagram representing an example user interaction session 800, which comprises an arrangement of information that is stored in a computer readable memory device 104, 1806. FIG. 8B is an illustrative flow diagram representing a process 850 to improve the performance of a computer-based interactive visualization system. A server system 1800 includes processor circuitry 1802 and a storage device 1804 that stores instructions to configure the processor to perform the process 850. At operation 852, the server system receives time-stamped user interaction session data. A user interaction session includes a recording of a user's digital interactions with a digital asset. An example user interaction session includes a render structure sequence 204, an image frame sequence 210 and an event sequence 214. Image frame sequence 210 represents motion picture image frames captured during the interaction session. Render structure 204 represents render structures captured during an example user interaction session. Event sequence 214 represents a sequence of events captured during the user interaction session. The example sequence 210, which includes image frames $MP_A$, $MP_B$, $MP_O$, $MP_U$, $MP_T$, and the example event sequence 214, which includes events $E_{A1}$, $E_{A2}$, $E_{B1}$, $E_{B2}$, $E_{O1}$, $E_{O2}$, $E_{O3}$, $E_{O4}$, $E_{U1}$, $E_{U2}$, $E_{U3}$, $E_{T1}$, and $E_{T2}$ represent what a user experiences during the user's digital interactions with a digital asset. The render structure sequence 204 is used in a user's computer device 104 to present the image frame sequence 210 and an event sequence 214 during the user's digital interactions with a digital asset. It will be appreciated that a user interaction session can include different or additional recorded user experience information such as audio recordings of a user's comments or camera image recordings of a user's face, for example.

At operation 854, the server computer system 1800 identifies render structure subsequences based upon similarity matching. The server computer system 1800 is configured to use the user interaction session 800 to identify render structure subsequences $SUB_A$, $SUB_B$, $SUB_O$, $SUB_U$, and $SUB_T$, within the render structure sequence 204, based upon similarity process of FIG. 4. Each render structure subsequence contains a sequence of similar render structures. More particularly, the server computer system 1800 is configured to use above-described example render structure cluster identification and similarity matching process 400 to perform similarity comparisons of render structures within the example render structure sequence 204 to identify multiple example render structure subsequences $SUB_A$, $SUB_B$, $SUB_O$, $SUB_U$ and $SUB_T$. In the example sequence 204, the first render structure similarity matching process 400 identifies render structure clusters $SUB_A$, $SUB_B$, $SUB_O$, $SUB_U$ and $SUB_T$ that meet the similarity requirement. In other words, for example, the render structures within cluster $SUB_A$ match one another based upon the similarity metric more closely than they match the render structures within subsequences $SUB_B$, $SUB_O$, $SUB_U$ and SUBT based upon the similarity metric.

At operation 856, the server computer 1800 produces representative render structures based upon the render structure subsequences. The server computer system 1800 is configured to use the render structure subsequences to produce corresponding representative render structures. In an example system, producing a representative render structure for a render structure subsequence involves selecting a render structure from within the sequence. In one example system, a representative render structure is selected from the middle of each render structure sequence.

Referring to the example user action session 800, representative render structure A is selected to represent the render structure subsequence $SUB_A$; representative render structure B is selected to represent render structure subsequence $SUB_B$; representative render structure O is selected to represent render structure subsequence $SUB_O$; representative render structure U is selected to represent render structure subsequence $SUB_U$; and representative render structure T is selected to represent render structure subsequence $SUB_T$.

At operation 858, the server computer system 1800 associates render structure subsequences with sequential time intervals. The server computer system 1800 is configured to associate render structure subsequences with a time intervals. Recall that render structures are time stamped. In the example user interaction session 800, render structure subsequence $SUB_A$ corresponds to time interval $T_1$; render structure subsequence $SUB_B$ corresponds to time interval $T_2$; render structure subsequence $SUB_O$ corresponds to time interval $T_3$; render structure subsequence $SUB_U$ corresponds to time interval $T_4$; and render structure subsequence $SUB_T$ corresponds to time interval $T_5$.

At operation 860, the server computer system 1800 orders the representative render structures with based upon the sequential time intervals. Each representative render structure is ordered based upon the render structure sequence to which it corresponds. Each representative render structure has a sequence position that corresponds to the temporal sequence of the render structure subsequence that it represents. For example, representative render structure A has a first sequence position corresponding to time interval $T_1$. Representative render structure B has a second sequence position corresponding to time interval $T_2$. Representative render structure O has a third sequence position corresponding to time interval $T_3$. Representative render structure U has a fourth sequence position corresponding to time interval $T_4$. Representative render structure T has a fifth sequence position corresponding to time interval $T_5$.

At operation 862, the server computer system 1800 clusters user experiences based upon time stamp matching to render structure subsequence time intervals. The server computer system 1800 is configured to cluster user experiences based upon the render structure subsequence time intervals. Recall that user experiences, e.g., motion pictures $MP_A$, $MP_B$, $MP_O$, $MP_U$, $MP_T$ and events $E_{A1}$, $E_{A2}$, $E_{B1}$, $E_{B2}$, $E_{O1}$, $E_{O2}$, $E_{O3}$, $E_{O4}$, $E_{U1}$, $E_{U2}$, $E_{U3}$, $E_{T1}$, and $E_{T2}$, are time stamped.

User experiences are clustered based upon correspondence between the render structure subsequence time intervals and user experience time stamps. For the example user interaction session 800, render structure subsequence $SUB_A$ is associated in a computer readable storage device with a cluster of user experiences $MP_A$, $E_{A1}$, and $E_{A2}$. It will be appreciated, for example, that the render structure subsequence $SUB_A$ is operative during a time interval $T_1$ to present user experiences $MP_A$, $E_{A1}$, and $E_{A2}$ at the user computer 104, and that user experiences, therefore, have time stamps that fall within time interval $T_1$. Render structure subsequence $SUB_B$ is associated in a computer readable storage device with a cluster of user experiences $MP_B$, $E_{B1}$, and $E_{B2}$. Render structure subsequence $SUB_O$ is associated in a computer readable storage device with a cluster of user experiences $MP_O$, $E_{O1}$, $E_{O2}$, $E_{O3}$, and $E_{O2}$. It will be appreciated, for example, that the render structure subsequence $SUB_O$ is operative during a time interval $T_3$ to present user experiences $MP_O$, $E_{O1}$, $E_{O2}$, $E_{O3}$, and $E_{O2}$ at the user computer 104, and that user experiences, therefore, have time stamps that fall within time interval $T_3$. Render structure subsequence $SUB_U$ is associated in a computer readable storage device with a cluster of user experiences $MP_U$, $E_{U1}$, $E_{U2}$, and $E_{U3}$. Render structure subsequence $SUB_T$ is associated in a computer readable storage device with a cluster of user experiences $MP_T$, $E_{T1}$, and $E_{T2}$.

At operation 864, the server computer system 1800 produces a user interface experience card to each cluster of user experiences. The server computer system 1800 is configured to produce a user experience interface card corresponding to each representative render structure. For example, the server computer system 1800 is configured to produce user experience card $C_A$ to correspond to representative render structure A and to associate user experience card $C_A$ with representative render structure A in a computer readable memory device. User experience interface card $C_A$ includes motion picture sequence $MP_A$ and includes events $E_{A1}$, $E_{A2}$. Similarly, the server system 1800 produces user experience card $C_B$ to correspond to representative render structure B and to associate user experience card $C_B$ with representative render structure B in a computer readable memory device. User experience interface card $C_B$ includes motion picture sequence $MP_B$ and includes events $E_{B1}$, $E_{B2}$. User interface cards $C_O$, $C_U$, and $C_T$ are similarly produced and associated in a memory device with corresponding representative render structures O, T, and T.

Thus, it will be appreciated that example user experience interface card $C_A$ can provide an interface to user experiences, specifically the motion picture subsequence $MP_A$ and events $E_{A1}$ and $E_{A2}$, as described generally described above with reference to FIG. 7. Example user experience interface card $C_B$ can provide an interface to user experiences, specifically the motion picture subsequence $MP_B$ and events $E_{B1}$ and $E_{B2}$. Example user experience interface card $C_O$ can provide an interface to user experiences, specifically the motion picture subsequence $MP_O$ and events $E_{O1}$, $E_{O2}$, $E_{O3}$, and $E_{O4}$. Example user experience interface card $C_U$ can provide an interface to user experiences, specifically the motion picture subsequence $MP_U$ and events $E_{U1}$, $E_{U2}$, and $E_{U3}$. Example user experience interface card $C_T$ can provide an interface to user experiences, specifically the motion picture subsequence $MP_T$ and events $E_{T1}$ and $E_{T2}$.

At operation 866, the server computer system is configured to associate each user interface card with a representative render structure. The server computer system 1800 is configured to associate in a computer readable memory device, each user experience interface card with a representative render structure that corresponds to the render structure subsequences to which the card corresponds. For example, in the illustrative session information structure 800 of FIG. 8A, user experience interface card $C_A$ is associated with representative render structure A. User experience interface card $C_B$ is associated with representative render structure B. User experience interface card $C_O$ is associated with representative render structure O. User experience interface card $C_U$ is associated with representative render structure U. User experience interface card $C_T$ is associated with representative render structure T.

Thus, example representative render structure A is associated with user experience interface card $C_A$ can be used to present a cluster of user experiences represented by motion picture subsequence $MP_A$ and events $E_{A1}$ and $E_{A2}$ presented at the user computer 104 using the render structure subsequence of the $SUB_A$ during time interval $T_1$. As such, representative render structure A acts as a sequential chronological marker for user experience interface card $C_A$ and user experiences $MP_A$, $E_{M1}$ and $E_A$ corresponding to card $C_A$. Similarly, representative render structures B, O, U, and T act as sequential chronological markers for user experience interface cards $C_B$, $C_O$, $C_U$ and $C_T$. As explained below, in an example system each of the representative render structures A, B, O, U and T is associated with a sequence position in Sankey diagram, and through that association, cards $C_A$, $C_B$, $C_O$, $C_U$ and $C_T$ are associated with corresponding sequence positions in a Sankey diagram.

Moreover, as explained below, the server computer system 1800 is used to align representative render structures from different user interaction sessions. As explained more fully below, the server computer system 1800 is configured to use above-described example render structure cluster identification and similarity matching process 400 to perform similarity comparisons of representative render structures from different user interaction sessions. The server computer system 1800 is configured to sequentially align matching render structures from different user interaction sessions based upon similarity matching of representative render structures within the different representative render structure sequences.

Multiple Sequence Alignment

A sequence alignment process aligns multiple representative render structure sequences based upon matching representative render structures within the sequences. An example sequence alignment process aligns multiple sequences so that matching representative render structures in different sequences have matching sequence positions in the different sequences. Conversely, the example sequence alignment process aligns the multiple sequences so that non-matching representative render structures in different sequences have non-matching sequence positions in the different sequences.

Sequence alignment involves arranging items in sequences to identify similarities in different sequences of elements and to identify sequence patterns and anomalies [26]. As used herein, an anomaly refers to a sequence that is at a significant variance from other sequences. Computational biologists commonly use sequence alignment techniques to identify preserved structures in DNA and protein sequences with shared evolutionary ancestry. In some sequence alignment techniques, given a set of sequences, an alignment algorithm inserts "gaps" into them to adjust the sequence to maximize the number of identical elements in the sequences occurring at the same sequence position across all of the given sequences. The inventors realized that for directed interaction sessions, there is an a priori expectation that users will attempt the same or a similar set of tasks in the same or a similar order. Given these more constrained sequences, the inventors realized that alignments of interaction sessions evidenced by data captured across multiple user interaction sessions can reveal common user experiences throughout a flow visualization representing the multiple user interaction sessions. Moreover, the inventors realized that in the UX research context, multiple sequence alignment (MSA) provides the unexpected benefit of enabling UX visualizations with Sankey diagram techniques that do not increasingly fracture and diverge with increasing sequence positions.

FIG. 9A-9D are illustrative drawings representing an example sequence alignment adjustment process. FIG. 9A is an illustrative drawing showing a set of representative render structures labeled A, B, O, R, T and U and showing representative render structure sequences containing differently ordered sequences of representative render structures from the set. FIG. 9B is an illustrative drawing representing a pairwise alignment scoring process to determine which sequence has the closest alignment with all of the other sequences. FIG. 9C is an illustrative drawing representing a gap insertion process to progressively align the multiple sequences with the sequence determined to have the closest alignment with all of the other sequences. FIG. 9D is an illustrative drawing representing a final alignment with gaps inserted at sequence positions to achieve alignment of representative render structures. It is noted that not all matching representative render structures are aligned across sequences.

Referring to FIG. 9A, the example explains how the alignment process aligns five example representative render structure sequences based upon similarity of representative render structures contained within the sequences and their sequence orders. Each sequence includes four or more of a set of six representative render structures designated as, A, B, O, R, T and U. In this example, representative render structures having the same designation in different sequences represent representative render structures in those different sequences determined to match, based upon the similarity process of FIG. 4. Thus, for example, representative render structure designated "A" in the sequence ABBOT was determined to match the representative render structure designated "A" in sequence ABOUT.

Table A sets forth five representative render structure sequences and indicates the pre-alignment sequence positions of representative render structures within the sequences. For example, referring to the sequence identified as $A_1B_2B_3O_4\ T_5$, the subscript "1" associated with representative render structure "A" indicates that render structure A is at the first sequence position of the representative render structure sequence ABBOT. Continuing with the $A_1B_2B_3O_4T_5$ example, representative render structure "B" is at the second and third sequence positions of the render structure; representative render structure O is at the second and fourth sequence position; and render structure; representative render structure T is at the fifth sequence position.

TABLE A

| Sequence No. | Representative Render Structure Sequences & Pre-alignment Sequence Positions |
| --- | --- |
| $S_1$ | $A_1B_2B_3O_4T_5$ |
| $S_2$ | $A_1B_2O_3U_4T_5$ |
| $S_3$ | $A_1O_2R_3T_4A_5$ |
| $S_4$ | $A_1B_2U_3T_4$ |
| $S_5$ | $A_1R_2B_3O_4R_5$ |

Referring to FIG. 9B, the example alignment adjustment process uses a solution to the MSA problem called the Star Alignment method [26] to align the representative render structure sequences. The example alignment process first computes all pairwise alignments among sequences using Needleman-Wunsch algorithm [26] to compute the optimal—highest-scoring—pairwise alignment between two sequences. For each pairwise alignment each sequence position of each sequence contributes to overall scores for each of the sequence: two matching representative render structures in the same sequence position contribute positively, whereas two non-matching representative render structures or a representative render structure and a gap contribute negatively. The star alignment algorithm recognizes a sequence that is most similar to all the other sequences—the sequence with the highest sum of pairwise alignment scores—as "center of the star." In this example, the sequence $S_2$ (ABOUT), the example sequence discussed with reference to FIG. 8A, is determined have the highest score, five (5), and therefore, is designated as the center of the star.

Referring to FIG. 9C, the example alignment adjustment process progressively merges together the star center sequence's pairwise alignments. For example, referring to the first column of sequences in FIG. 9C, the A, B, U and T representative render structures of the sequences $S_2$ and $S_4$ are incrementally aligned by inserting a gap at sequence position three of sequence $S_4$ to incrementally shift sequence $S_4$ to produce $A_1B_{2\_3}U_4T_5$. Referring to the second column, the incrementally shifted sequence $A_1B_{2\_3}U_4T_5$ is further incrementally aligned by inserting a gap at sequence position two of the shifted sequence $S_4$ to produce to produce the further incrementally shifted sequence $A_{1\_2}B_{3\_4}U_5T_6$. Referring to the third column, the incrementally shifted sequence $S_4$ is further incrementally aligned by inserting a gap at sequence position seven of the further shifted sequence $S_4$ to produce the still further incrementally shifted sequence $A_{1\_2}B_{3\_4}U_5T_{6\_7}$. It will be understood that the shifting of $S_4$ is to achieve more complete alignment with the star sequence $S_2$. Referring to the second column, it is noted that the star sequence $S_2$ is shifted to achieve more complete alignment with the other sequences.

Referring to FIG. 9D, there is shown the final adjusted multiple sequence alignment produced using the alignment adjustment process. Table B sets forth the five representative render structure sequences and indicates the post-alignment sequence positions of representative render structures within the sequences.

TABLE B

| Sequence No. | Representative Render Structure Sequences & Post-Alignment Sequence Positions |
| --- | --- |
| $S_1$ | $A_1B_2B_3O_{4\_5}T_{6\_7}$ |
| $S_2$ | $A_{1\_2}B_3O_4U_5T_{6\_7}$ |
| $S_3$ | $A_{1\_2\_3}O_4R_5T_6A_7$ |
| $S_4$ | $A_{1\_2}B_{3\_4}U_5T_{6\_7}$ |
| $S_5$ | $A_1R_2B_3O_4R_{5\_6\_7}$ |

Thus, it can be seen that all five sequences have matching representative render structures A at their first sequence positions. None of the sequences have matching representative render structures at their second sequence positions. Sequences $S_1$, $S_2$, $S_4$ and $S_5$, have matching representative render structures B at their third sequence positions. Whereas, sequence $S_3$ has a gap at its third sequence position. The example progressive alignment procedure preserves gaps found in each pairwise alignment, and results in an MSA but does not guarantee an optimal alignment. For example, the fifth sequence positions of $S_2$ and $S_4$ contain representative render structure U, and the fifth sequence positions of $S_3$ and $S_5$ contain representative render structure R. Thus, both matching and non-matching render structures are provided at the fifth sequence position.

Analytic Interactive Visualization Interface

An example analytic interactive visualization (AIV) interface improves the functioning of a computer system by providing indicators of clusters of user experience information arranged on an electronic screen display to indicate similar clusters of user experience information that occurred at different sequence positions in different ones of multiple different user interaction sessions. This approach makes user experience information from the different user interaction sessions more easily browsable using a computer system, for example, by avoiding the need to sequentially search through different sequences of user experience information from multiple user interaction sessions to identify similarities and differences in sequences of user experience. More concretely, for example, each of multiple sequences of user experience information can include a continuous sequence of event-driven motion pictures. The AIV interface improves functioning of a computer system by arranging sequence positions of indicators of clusters of similar event-driven motion picture segments based upon the similarity of the event-driven motion pictures, which obviates the need for an analyst to chronologically search through each of multiple sequences of event-driven motion pictures to identify similarities and differences.

The AIV interface is produced by identifying and aligning user experience information from different sequences of user experience information based upon similarities in render structures used by different computer systems to render the user experience information in the different sequences of user experience information. User experience information for each sequence of user experience information is clustered based upon a matching of recording times of the user experience information with time intervals spanned by the render structures used to render the user experience information. Sequence positions of clusters of user experience information within each user experience information sequence correspond to sequence positions of render structures that are representative of the render structures used to render the user experience information. The sequence positions of the user experience information are adjusted to align clusters of user experience information from different sequences of user experience information, based upon similarity of representative render structures corresponding to different sequences of user experience information.

More particularly, an example AIV interface simultaneously represents multiple user interaction sessions. An example AIV interface includes a Sankey diagram that includes a set of nodes and edges between them that represent sequences of representative render structures that correspond to chronological moment sequences captured during user interaction sessions. Each node in the Sankey diagram corresponds to one or more matching representative render structures that are determined, according to the sequence alignment process, to have a common sequence position. Each respective representative render structure has an association in memory with a respective user experience interface card. Each respective user experience interface card provides an interface to recorded chronological moments that include clusters of events, motion picture sequences and/or audio segments that correspond chronologically to the respective representative render structure to which the card corresponds. In an example system, sequence positions of representative render structures determined according to the processes described with reference to FIGS. 9A-9D are mapped to Sankey diagram sequence positions. Thus, individual sequence positions in the Sankey diagram correspond to one or more representative render structures determined to correspond to the sequence position.

The size (e.g., height) of a node in the Sankey diagram is proportional to the number of representative render structures that correspond to the node, and therefore, to the number of respective users who are associated with the node and who experienced chronological moments that correspond to a respective representative render structure aligned to a sequence position corresponding to the node. The thickness of an edge between two successive nodes in the Sankey diagram, going from left to right, indicates the fraction of respective users who transitioned during an interaction session, from a representative render structure corresponding to the left node to a representative render structure corresponding to the right node. In an example system, a web user interface to visualize a VAIV is built using React and Data-Driven Documents (d3) [6] libraries.

Figure 10A:
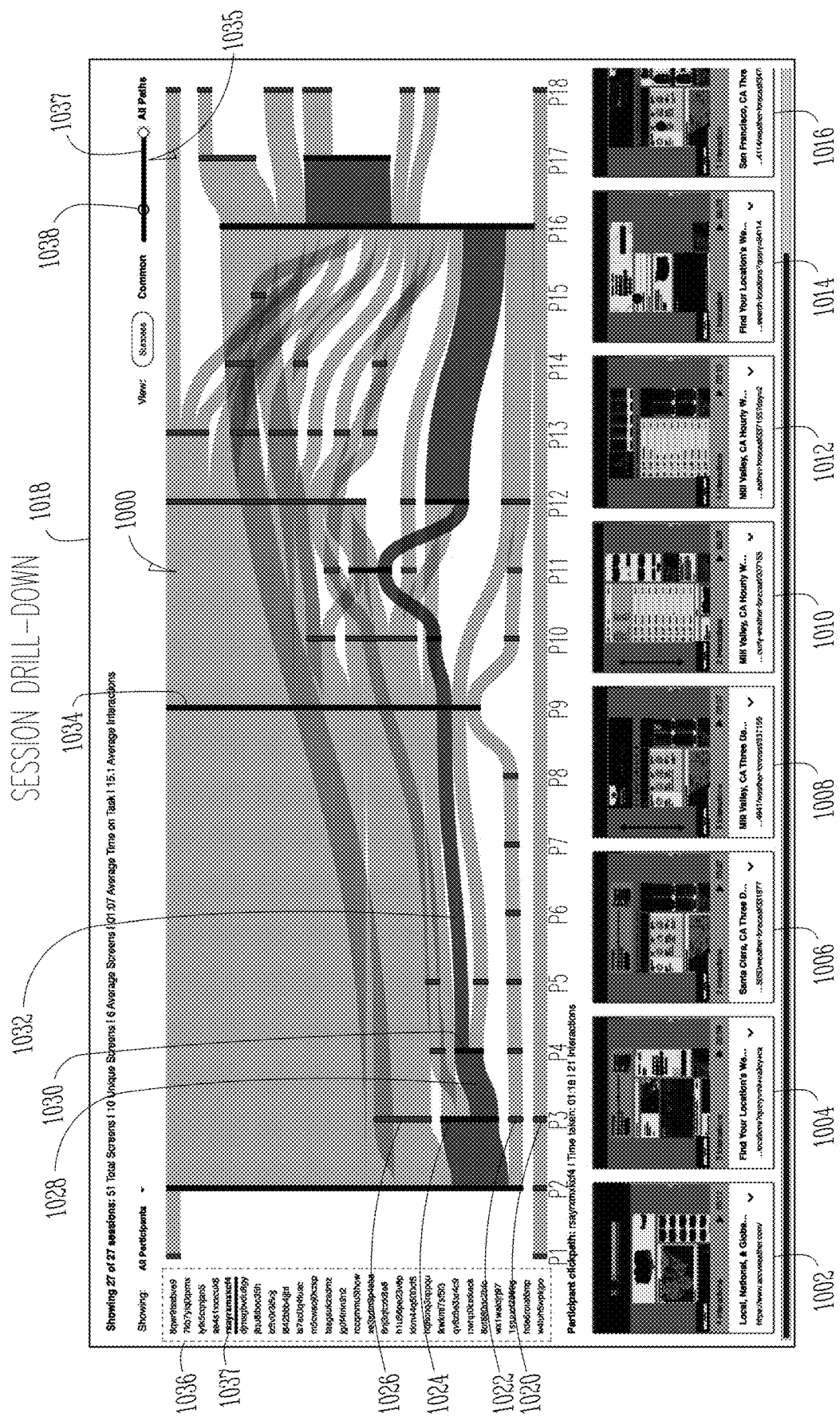
FIG. 10A is an illustrative drawing showing an example first Sankey diagram and multiple user experience cards that correspond to a single user interaction session, presented on a computing device display screen.

FIG. 10A is an illustrative drawing showing an example first Sankey diagram 1000 and multiple user experience interface cards 1002-1016 that correspond to a single user interaction session, presented on a computing device display screen 1018. The example Sankey diagram 1000 includes a plurality of sequence positions P1-P18, each associated with one or more nodes. It will be appreciated that each node corresponds to one or more representative render structures and that most representative render structures that correspond to a given node are matching representative render structures. Conversely, most representative render structures that correspond to different nodes are non-matching representative render structures. However, recall that the sequence alignment process is not be perfect and can result in some sequence positions having non-matching representative render structures, although most representative render structures at any given node will match.

Sequence position P3, for example, is aligned with four nodes, nodes 1020, 1022, 1024 and 1026. For simplicity of explanation, it is assumed that nodes at matching sequence positions correspond to matching representative render structures, although as explained above, this may not always be the case since the sequence alignment process is imperfect. Thus, nodes 1020, 1022, 1024 and 1026 at sequence position P3 corresponds to matching representative render structures.

Sequence position P9, for example, is aligned with only one node, node 1034. The height of node 1024 is greater than the height of node 1020, which indicates that a larger number of representative render structures correspond to node 1024 than to node 1020, for example. An edge 1028 between node 1024 is thicker than an edge 1032 between node 1030 and node 1034 indicating that a larger number of users transitioned from node 1024 to 1030 than from node 1030 to node 1034, for example.

The example AIV interface includes an interactive user interaction session menu 1036 that includes a list of user interaction session indicators. In operation, in a session drill down mode, in response to an analyst's selection of a user interaction session indicator, a sequence of user experience interface cards are presented that correspond to the indicated session. In an example system, an analyst selects a user interaction session by hovering over a session indicator. In the example shown in FIG. 10A, an individual interaction session indicator "rsayxmxkcf4" 1037 is selected, and in response the sequence of interface cards 1002-1016 are displayed that correspond to the user interaction session indicated by a selected indicator. Additionally, nodes corresponding to the displayed interface cards are visually emphasized through highlighting, for example. In an example system, an analyst can cause a selection device to hover over any of the user experience interface cards 1002-1016 to enlarge it on the screen and then can drill-down into the selected interface card as explained above with reference to FIG. 7.

Figure 10B:
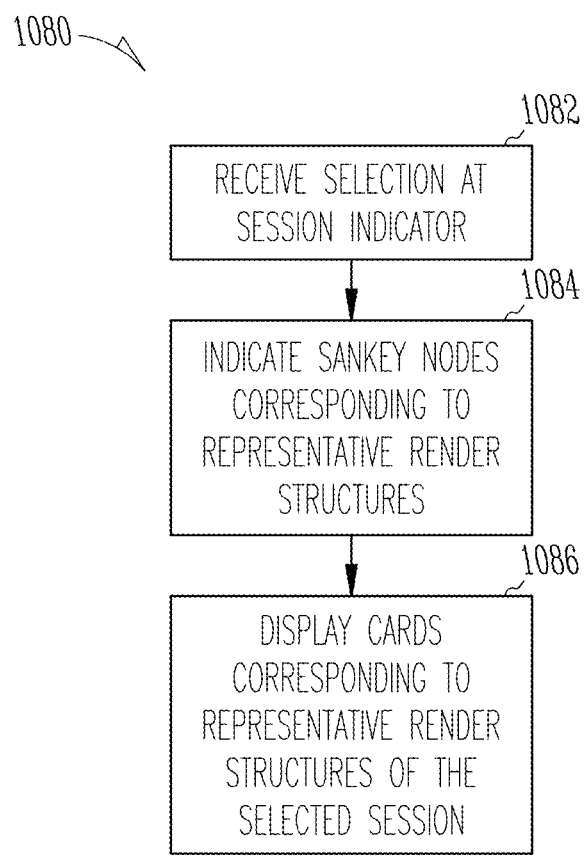
FIG. 10B is an illustrative flow diagram of an example process to drill-down into a user interaction session.

FIG. 10B is an illustrative flow diagram of an example process 1080 to drill-down into a user interaction session to display user experience interface cards included within the session. The server computer system 1800 includes processor circuitry 1802 and a storage device 1804 that includes code executable by the processor to configure the server computer system to perform the operations of the process 1080. Operation 1082 receives user input to select a session indicator. Operation 1084 displays an indication, through highlighting for example, of each node in the Sankey diagram having a sequence position that corresponds to a sequence position of a representative render structure contained within a representative render structure sequence that corresponds to the selected session. Operation 1086 displays a user experience interface card for each representative render structure in the representative render structure sequence. A user can separately interact with each card individually as described with reference to FIG. 7.

Figure 11A:
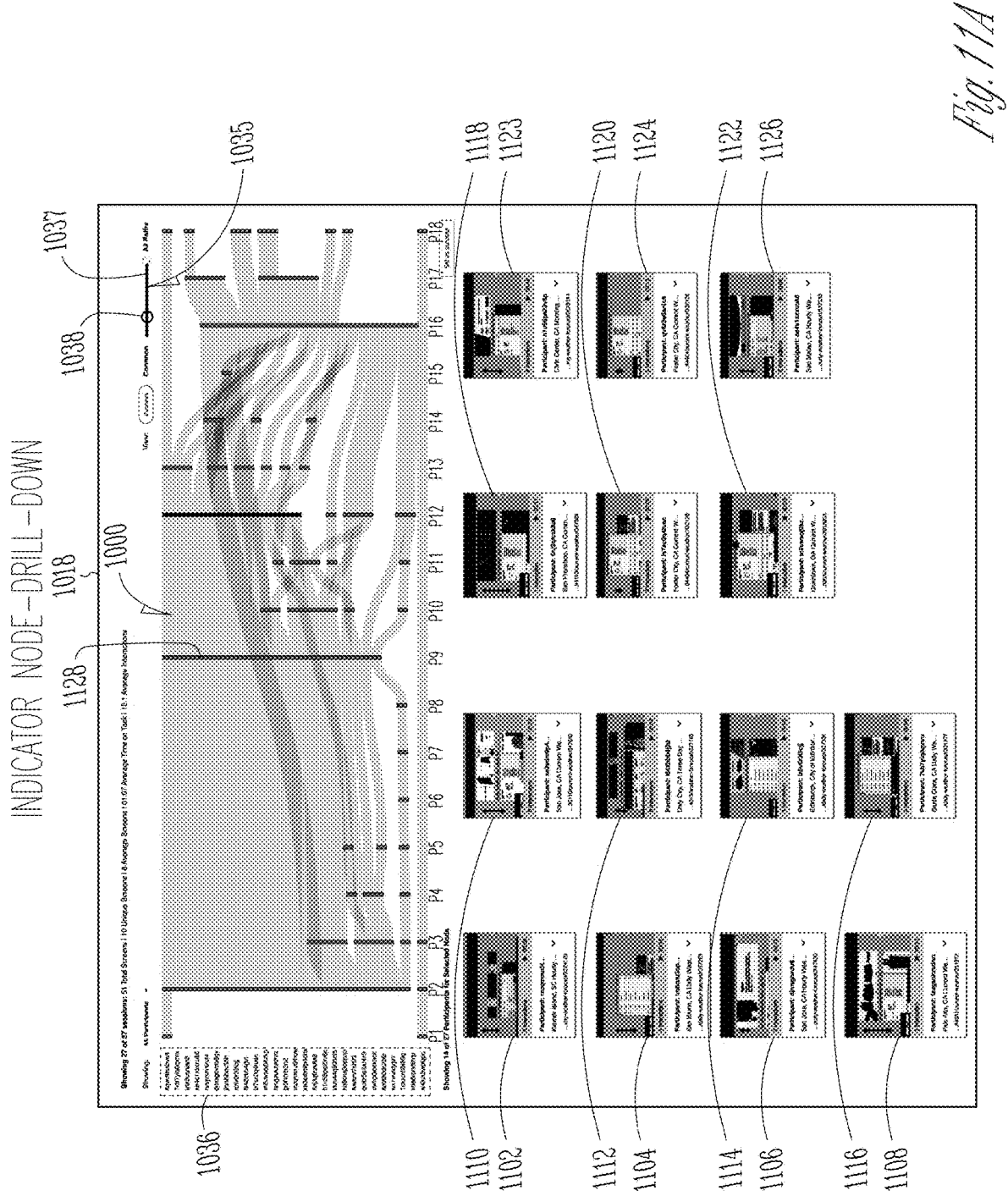
FIG. 11A is an illustrative drawing showing the example first Sankey diagram of FIG. 10A and multiple user experience cards that correspond to matching representative render structures that share a common sequence position, presented on a computing device display screen.

FIG. 11A is an illustrative drawing showing the example Sankey diagram 1000 of FIG. 10A and multiple user experience interface cards 1102-1126 that correspond to matching representative render structures that share a common sequence position, presented on a computing device display screen 1018. Each node is associated with a sequence position and corresponds to one or more matching representative render structures determined to correspond to the sequence position associated with the node. Thus, each node functions as an indicator, within the AIV interface, of the one or more matching representative render structures determined to correspond to the sequence position associated with the node. (It will be appreciated that as stated above, some nodes may correspond to both matching and non-matching representative render structures since the sequence alignment process is imperfect.) In operation, in a sequence position drill down mode, response to an analyst's selection of a node, a respective user experience interface card is presented for each respective matching representative render structure that corresponds to the selected node. In an example system, an analyst causes a selection device to hover over a selected node to select a set of matching representative render structure that correspond to the selected node. In FIG. 11A, node 1128, which acts as a selectable indicator of render structures associated with a sequence position P12 in the Sankey diagram 1000, is selected and in response, the multiple of interface cards 1102-1126 are displayed that correspond to the multiple matching representative render structures determined to correspond to the sequence position associated with node 1128. In an example system, an analyst can cause a selection device to hover over any of the user experience interface cards 1102-1126 to enlarge it on the screen and then can drill-down into the selected interface card as explained above with reference to FIG. 7.

Figure 11B:
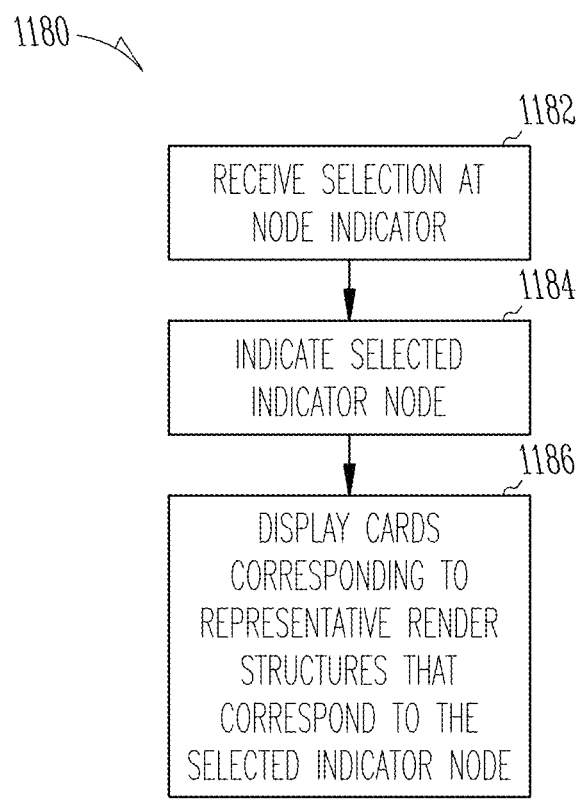
FIG. 11B is an illustrative flow diagram of an example process to drill-down into a node at a sequence position to display user experience interface cards indicated by a selected node at a sequence position.

FIG. 11B is an illustrative flow diagram of an example process 1180 to drill-down into a node at a sequence position to display user experience interface cards indicated by a selected node at a sequence position. The server computer system 1800 includes processor circuitry 1802 and a storage device 1804, 1806 that includes code executable by the processor to configure the server computer system to perform the operations of the process 1180. Block 1182 receives user input to select a node indicator. Operation 1184 displays an indication, through highlighting for example, of the selection of the selected node indicator in the Sankey diagram. Operation 1186 displays a user experience interface card for each representative render structure in that has a sequence position that matches a sequence position of the selected node indicator in the Sankey diagram. A user can separately interact with each card individually as described with reference to FIG. 7.

Progressive Interactive Sankey Diagrams

Referring to FIG. 10A and FIG. 11A, the VAIV interface includes an example node selector 1035 used to adjust the number of nodes displayed in the Sankey diagram based upon the number of representative render structures associated with displayed nodes. The number of representative render structures associated with a node is proportional to the number of user interaction sessions associated with the node, and therefore, is proportional to the number of users associated with the node. Thus, the height of a node is proportional to the number of users associated with the node. The example node selector 1035 includes a slider bar 1037 that represents a range of number of nodes to be displayed and a slider button 1038 that a Analyst can slide along the slider bar 1037 to select a number of nodes within the range. An example range extends between "common" in which only nodes visited by the largest number of users are displayed in the Sankey diagram and an "all paths" view in which all nodes visited by at least one user are displayed in the Sankey diagram. Selections of intermediate positions within the range result in display of nodes visited by a range of number of users that varies according to some pre-predetermined function. In one example system, the sliding scale range is linear.

Sankey Diagrams with an Event/Interaction Filter for User Experience Interface Cards FIGS. 12A-1-12B-2 are illustrative drawings showing an example second interactive Sankey diagram 1300 that includes a first panel region 1372 to display user experience interface cards and includes an event/interaction filter interface 1340 to filter user experience interface cards displayed in the first panel 1372, presented on a computing device display screen 1018. The example second interactive Sankey diagram 1300 shows an arrangement of multiple nodes 1302-1328 and multiple sequence positions P1-P12 to illustrate relationships among representative render structures determined for the interaction sessions indicated by the ten interaction session indicators 1330.

Figures 2, 12A:
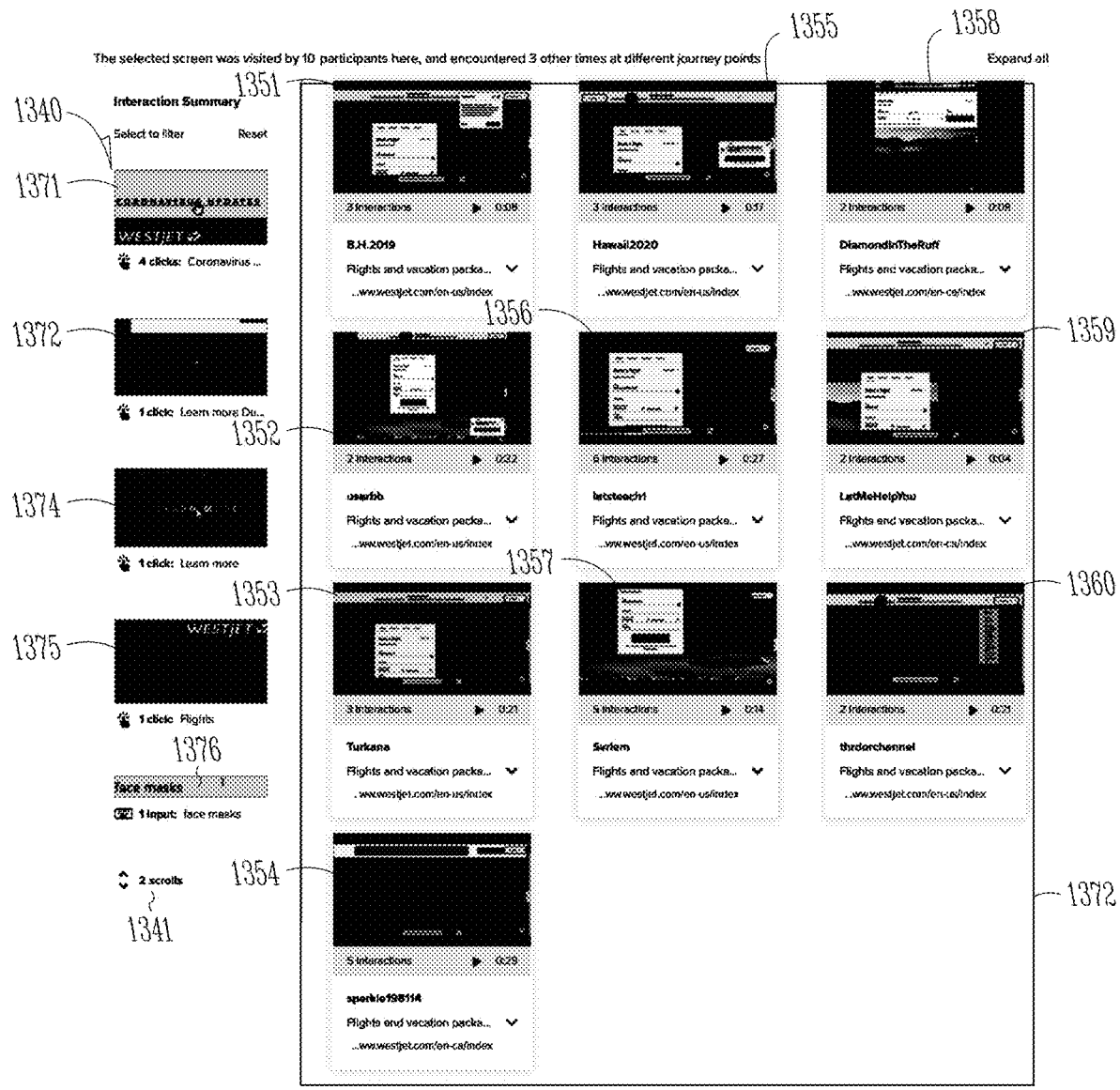

Referring to the example of FIG. 12A-1, 12A-2, in operation, user experienced events 1351-1360 are displayed in the first panel region 1372 in response to an analyst's selection of the node indicator 1302. In this respect, the second interactive Sankey diagram 1300 functions like the first interactive Sankey diagram 1000 described above. Also, in response to an analyst's selection of the node indicator 1302, a scrollable menu of individually selectable event/interaction indicators 1371-1375 is displayed in the event/interaction filter interface 1340. The event/interaction filter interface 1340 includes a scroll actuator 1341 to control scrolling of menu items (only four event/interaction indicators currently visible). Each individually selectable event/interaction indicator 1371-1375 corresponds to one or more user interactions that occurred during one or more of the multiple user interaction sessions (indicated by session indicators 1330) that resulted in corresponding events that are included in one or more of the displayed user experienced events 1351-1360 displayed in response to the Analyst selection of node indicator 1302.

Figures 1, 12B:
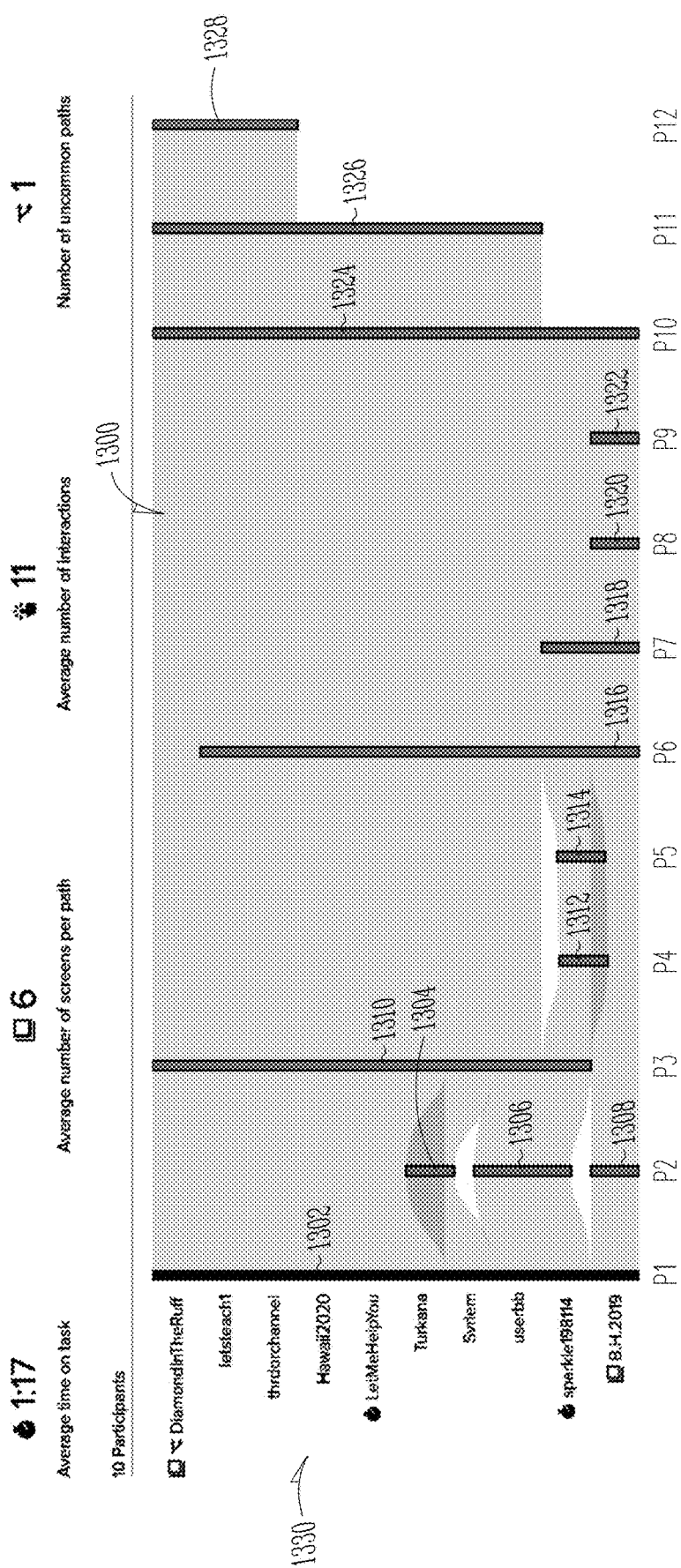
Figures 2, 12B:
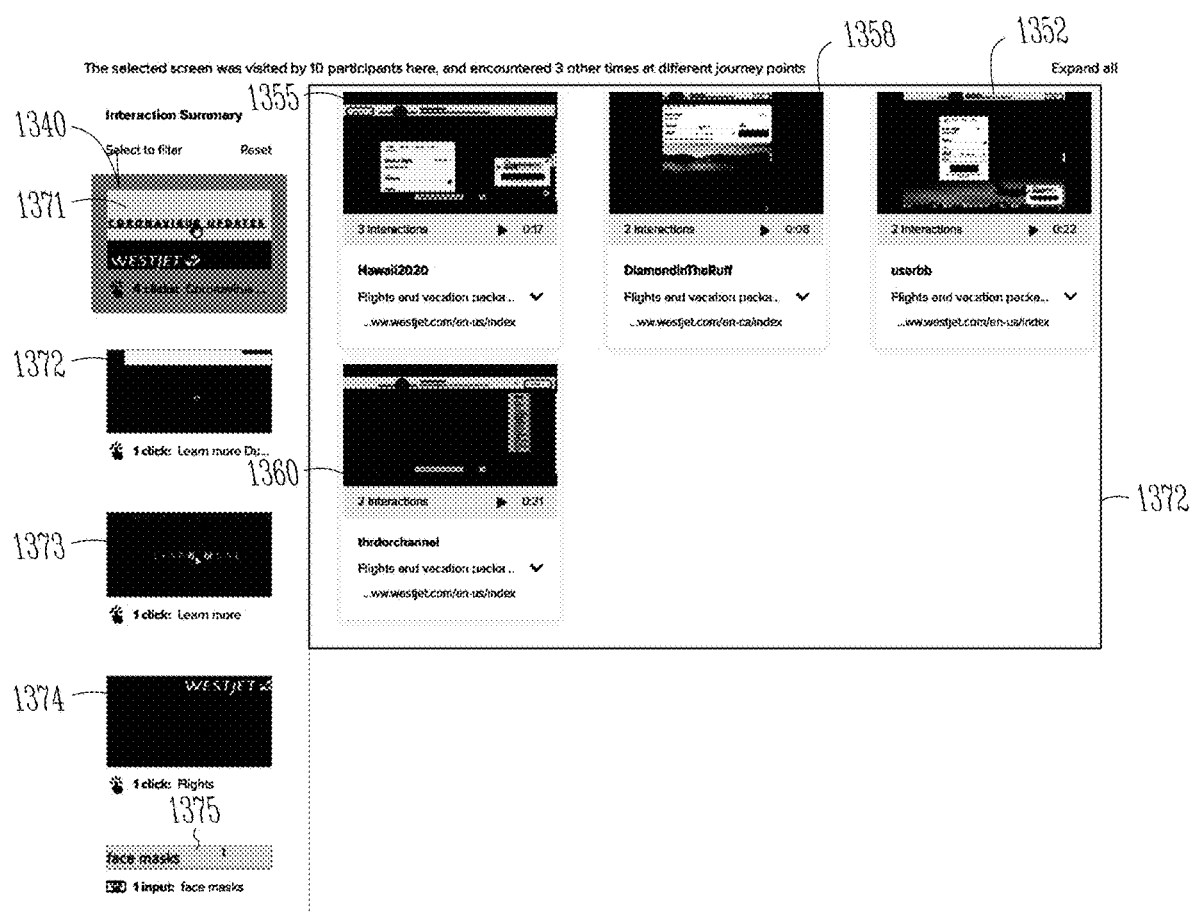

Referring to the example of FIGS. 12B-1, 12B-2, in operation, in response to an analyst selection of one of the selectable event/interaction indicators displayed in the event/interaction filter interface 1340, only a subset of those user experienced events 1351-1360 that were selected in response to a Analyst selection of the node indicator 1302 and that also include the one or more events indicated by the selected one of the selectable event/interaction indicators, are displayed in the first panel region 1372; the other user experience interface cards are filtered out. More particularly, in the example of FIGS. 12B-1, 12B2 an event/interaction indicator corresponding to a "Coronavirus Updates" link is selected. In response to the selection of the event/interaction indicator corresponding to a "Coronavirus Updates" link from within the event/interaction filter interface 1340, only the four (4) user experienced events 1352, 1355, 1358 and 1360 that include an event triggered by a user's interaction with the "Coronavirus Updates" link are displayed in the first panel region 1372. Six (6) user experienced events 1351, 1353, 1354, 1356, 1357 and 1358 are filtered out. Thus, an analyst can drill-down not only to chronological visual moments via an interaction node and corresponding user experience interface cards, but also, can drill-down to individual events of interest within chronological visual moments through user experience interface cards displayed in the first panel region and the event/interaction filter interface 1340.

Figure 12C:
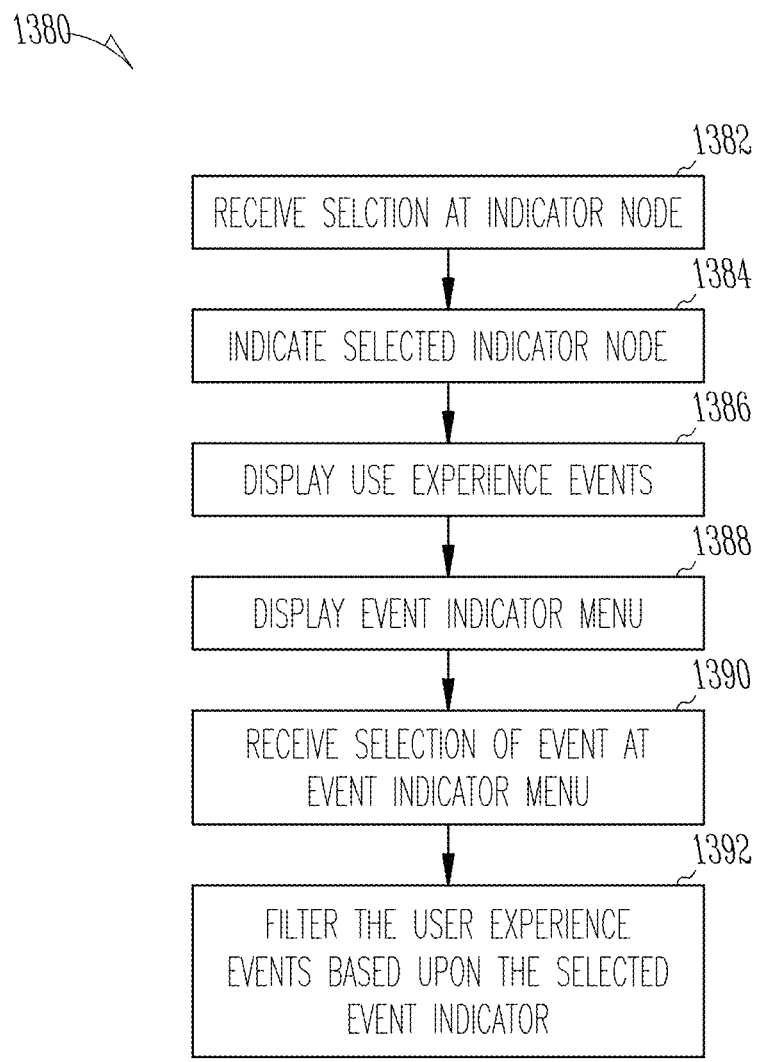
FIG. 12C is an illustrative flow diagram of an example process to drill-down events within matching representative render structures.

FIG. 12C is an illustrative flow diagram of an example process 1380 to drill-down events within matching representative render structures. The server computer system 1800 includes processor circuitry 1802 and a storage device 1804, 1806 that includes code executable by the processor to configure the server computer system to perform the operations of the process 1380. Operation 1382 receives user input to select a node indicator. Block 1384 displays an indication, through highlighting for example, of the selection of the selected node indicator in the Sankey diagram. Operation 1386 displays user experienced events included in one or more of the representative render structures in that have a sequence position that matches a sequence position of the selected node indicator in the Sankey diagram. Operation 1388 displays an event indicator menu. Operation 1390 receives user selection of an event indicator within the event indicator menu. Operation 1392 filters the displayed cards based upon an event indicated by the selected event indicator. A user can separately interact with each card individually as described with reference to FIG. 7.

Figures 1, 13A:
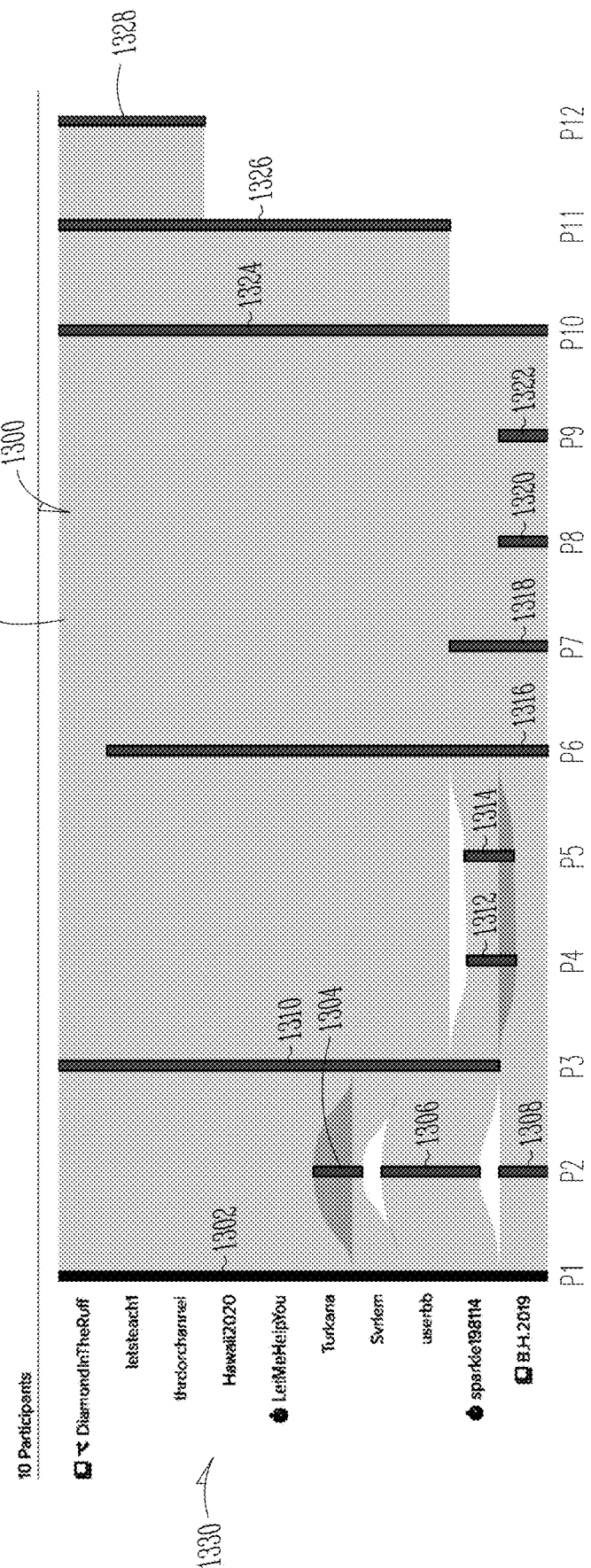
FIG. 13A is illustrative drawings showing an example Sankey diagram.
Figure 13A:
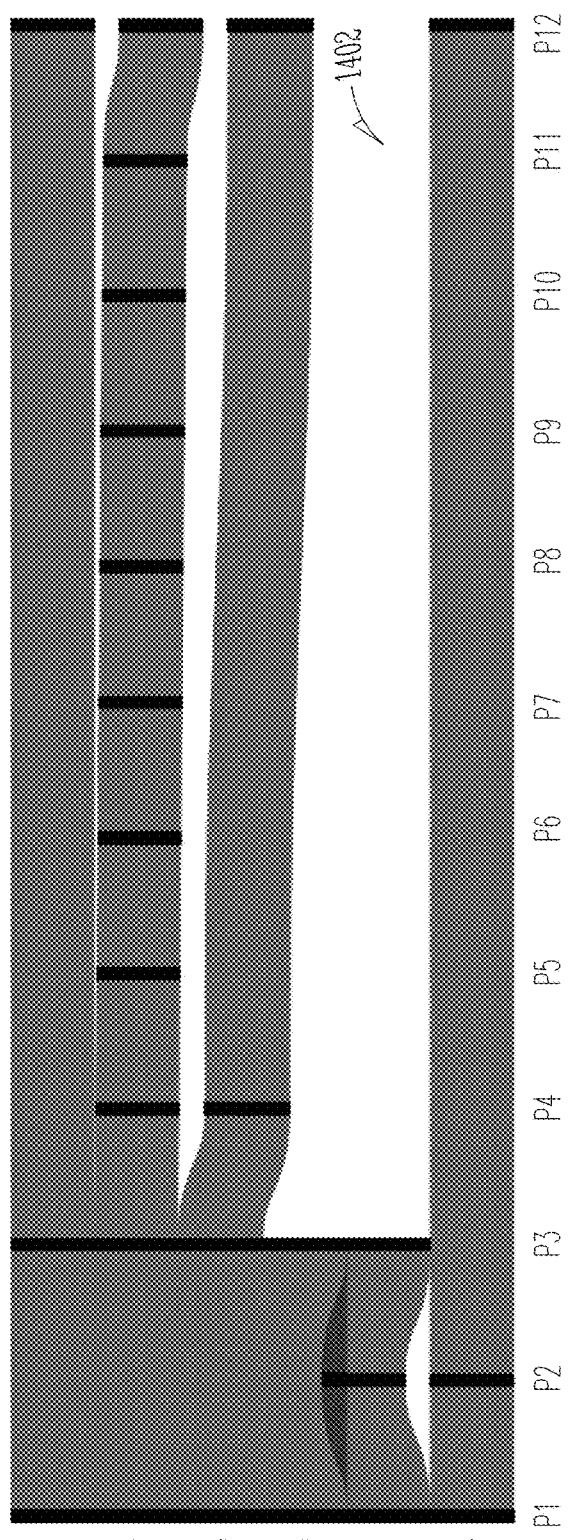
Figure 13B:
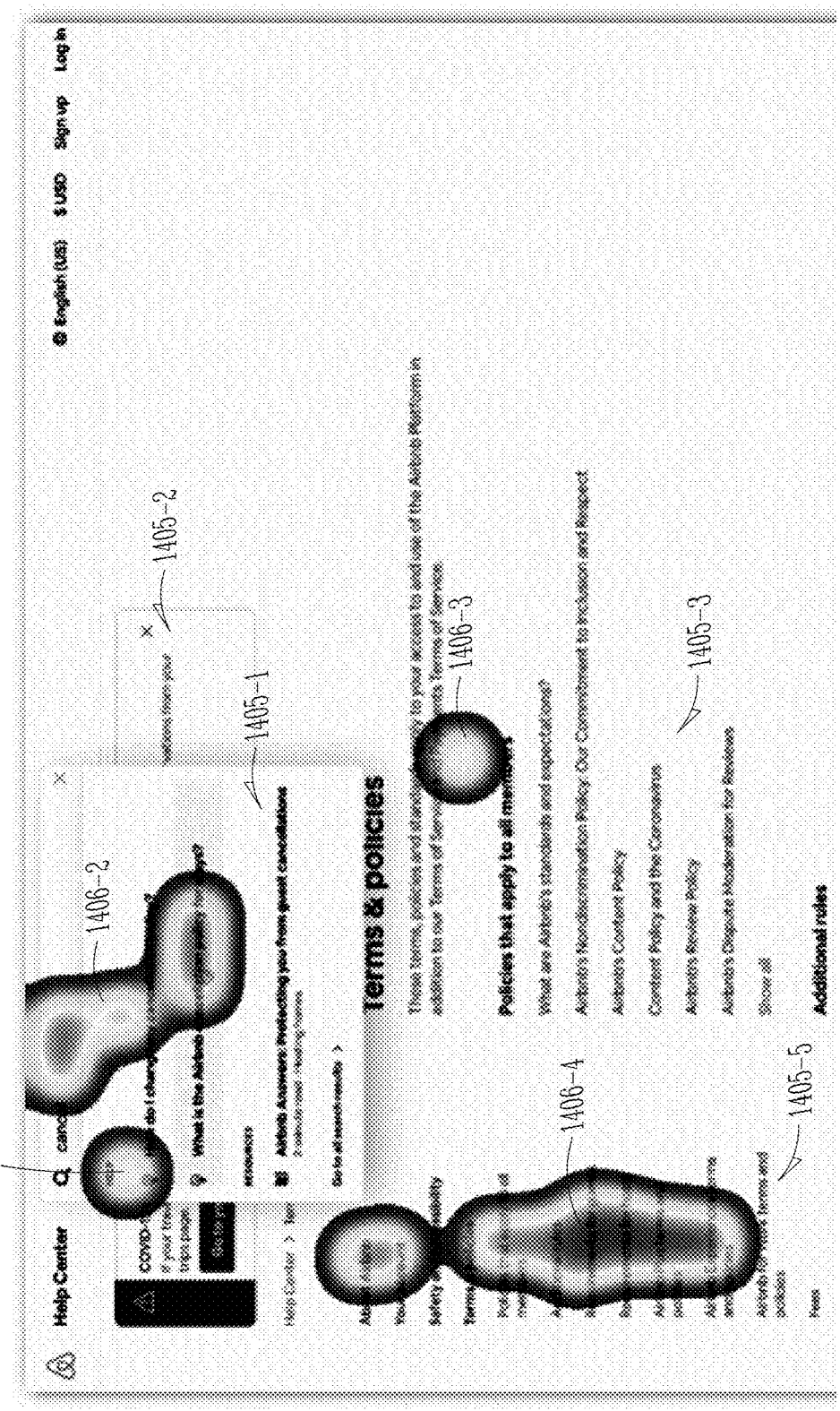
FIG. 13B is an illustrative drawing that shows an image of an example card that is overlaid with a user interaction heat map and that is associated with a selected sequence position of the Sankey diagram of FIG. 13A.

FIG. 13A is illustrative drawings showing a portion of an example interactive display 1400 that includes a third Sankey diagram 1402 that shows example sequences for six (6) example user interaction sessions. The Sankey diagram 1402 includes sequence positions P1-P12 in which an analyst has selected sequence position P3, which is shown highlighted. FIG. 13B is an illustrative drawing that shows an image of an example card 1404 that is associated with sequence position P3 of the Sankey diagram 1402 and that is that is overlaid with a user interaction heat map. The screen card image 1404 includes text regions 1405-1, 1405-2, 1405-2 and 1405-4 and includes multiple heat map regions 1406-1, 1406-2, 1406-3, 1406-4 indicating locations on cards associated with sequence position P3 where users have interacted. Heat map color (represented here with grey scale) indicates frequency of user selection at the different regions. FIG. 13C is an illustrative drawing that shows images of example cards 1410-1418 displayed in response to an analyst interacting with hear map region 1602-4. As represented in FIGS. 13B-13C, in an example system, when an analyst selects a region of a screen card image 1404 highlighted by the heat map images, by hovering or clicking for example, screen card images 1410-1418 are displayed that are from different user interaction sessions that correspond to a selected sequence position P3 and to a selected screen image location 1602-4. It will be understood that in an actual system, the images of FIGS. 13A, 13B, 13C are displayed on a single screen.

Selective Display of Common Paths and Anomalous Paths in a Sankey Diagram

Figure 14A:
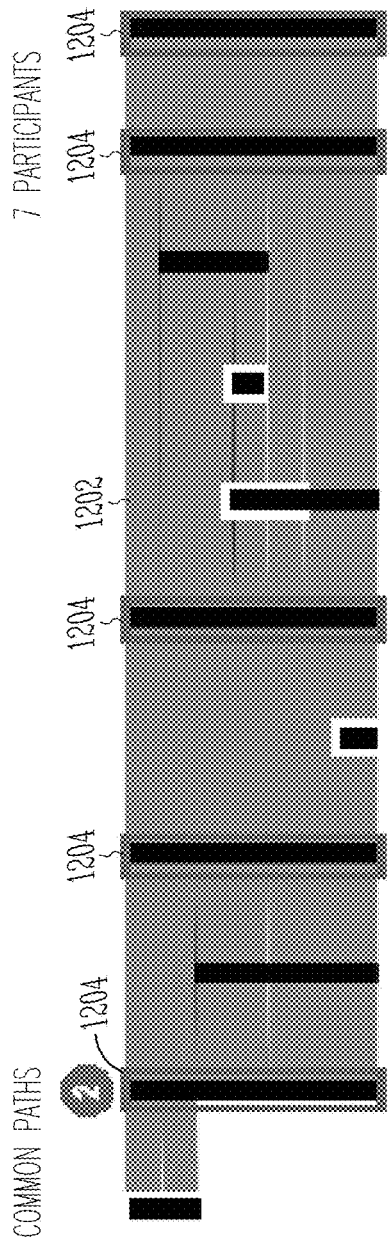
FIG. 14A shows an illustrative Sankey diagram displaying showing a common path.

FIG. 14A shows an illustrative Sankey diagram display 1202 emphasizing an example common path. The server computer system 1800 includes processor circuitry 1802 and a storage device 1804, 1806 that includes code executable by the processor to configure the server computer system to selectively display common paths on a display screen 1510. The Sankey diagram 1202 represents user interaction sessions of seven (7) users. Common paths are paths visited by a relatively larger number of users. Anomalous paths are paths visited by a relatively fewer number of users. It will be appreciated that where many user interaction sessions are evaluated, there can be a large number of intersecting paths, which can be challenging to evaluate. The ability to filter paths based upon frequency of users can clarify common user experience and anomalous user experience during interaction sessions. The node selector 1035 provides a sliding scale selection function between emphasis (e.g., highlighting) of common paths and emphasis of anomalous paths. In the example Sankey diagram 1202, common paths include generally taller nodes indicating that more users passed through the nodes, although common paths also can include some relatively shorter nodes. Conversely, anomalous paths include generally shorter nodes indicating that fewer users passed through the nodes, although anomalous paths can include some relatively taller nodes. A user's positioning of the slider button 1038 of the node display selector 1035 to select "Common" position causes only the most common path to be emphasized in the Sankey diagram 1202. In an example Sankey diagram 1202, increasingly more anomalous paths are filtered out (i.e. not displayed) as the slider button 1038 is positioned closer to the "Common Paths" position. The Sankey diagram 1202 includes an example common path with five tall nodes 1204 visited by the largest number of users. Common paths in a Sankey diagram are useful to provide insight into the most used paths, within multiple user interaction sessions.

Figure 14B:
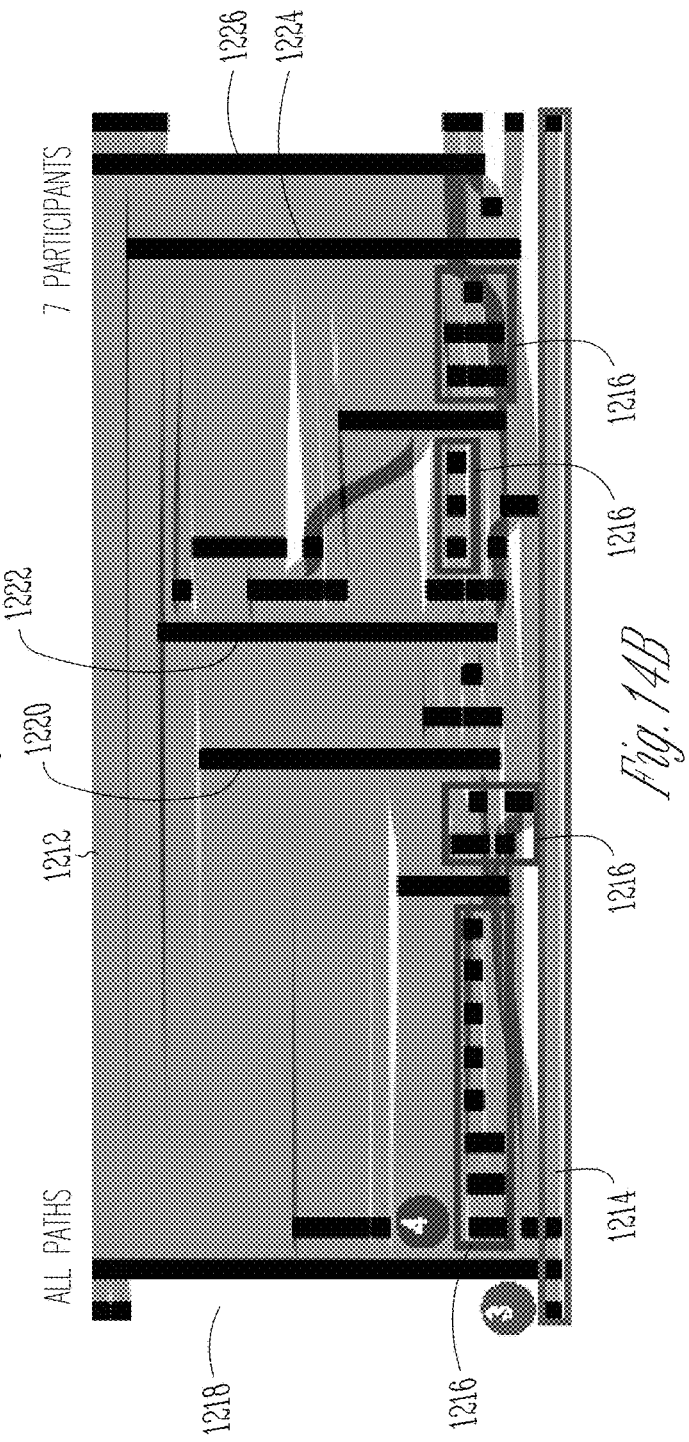
FIG. 14B shows an illustrative all paths Sankey diagram display showing common paths and anomalous paths.

FIG. 14B shows an illustrative an example Sankey diagram display 1212 emphasizing example anomalous paths. The server computer system 1800 includes processor circuitry 1802 and a storage device 1804 that includes code executable by the processor to configure the server computer system to selectively display anomalous paths on a display screen 1510. A user positioning the slider button 1038 to select the "All Paths" position causes all paths of the Sankey diagram 1202 to be displayed, both paths with tall nodes and paths with short nodes. Common paths in the Sankey diagram 1212 include relatively tall nodes such as one or more of nodes 1218-1226. An example first anomalous path includes numerous shorter nodes as emphasized by the bounding box labeled 1214. An example second anomalous path includes numerous shorter nodes, emphasized by bounding boxes labeled 1216. A larger number of shorter nodes in a path is indicative of the path being anomalous because the shorter the node, the fewer the number of users who traversed the node. Anomalous paths in a Sankey diagram are useful to provide insight into alternative divergent paths, within multiple user interaction sessions.

Selective Display of Tracing of Users of Partial Paths in a Sankey Diagram

Figure 15A:
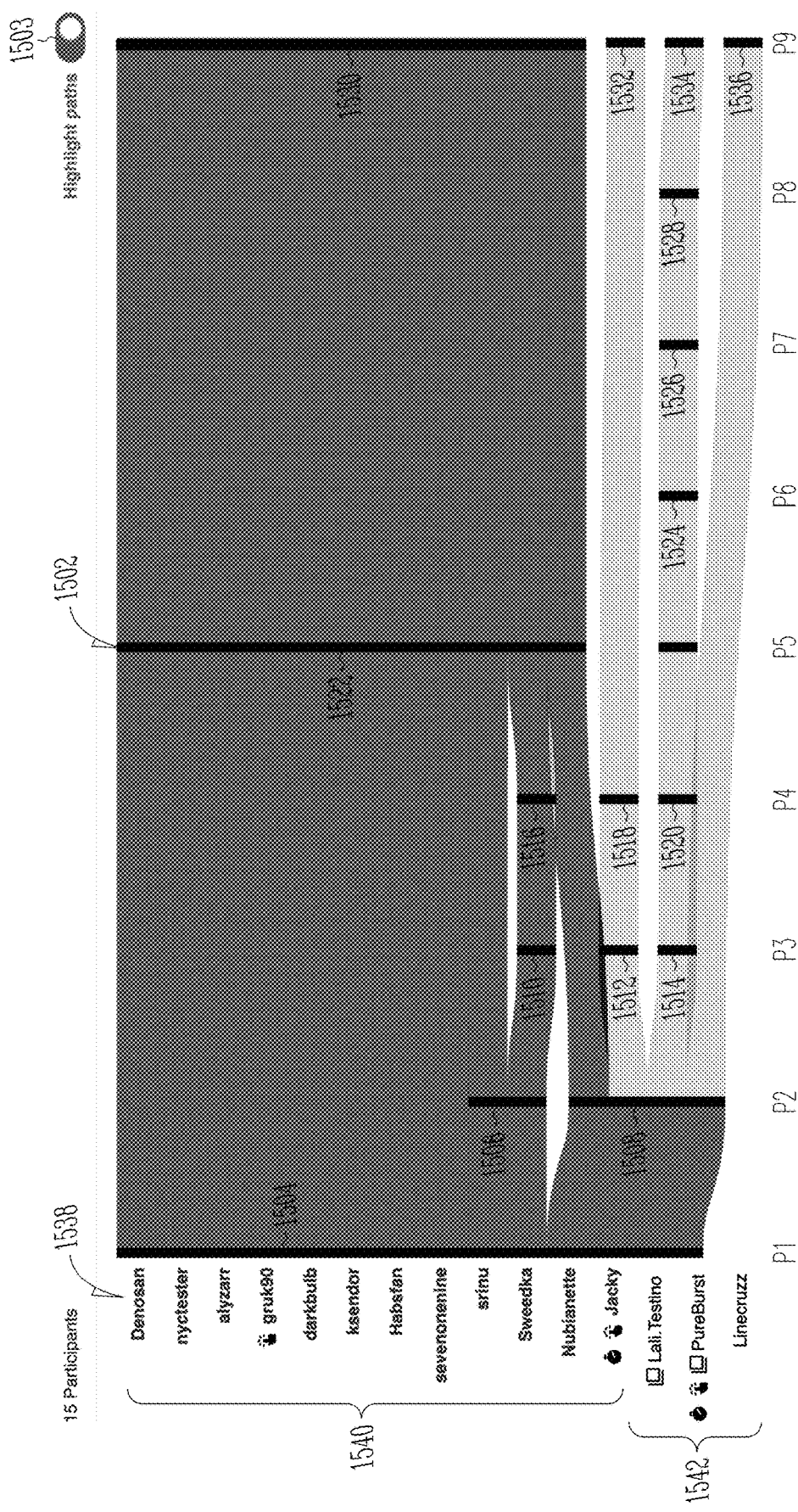
FIG. 15A is an illustrative Sankey diagram display in which a single endpoint node is selected for session tracing.

FIG. 15A is an illustrative Sankey diagram display 1502 including multiple nodes 1504-1536 aligned with sequence positions P1-P9 as shown, that represent fifteen (15) user interaction sessions 1538 in which an analyst selects node 1530 at sequence position P9. A tracing selector 1503 is provided at the display 1502 for an analyst to select a tracing mode. In the tracing mode, in response to an analyst's selection of node 1530, multiple user interaction sessions collectively labeled 1540, are emphasized (e.g., highlighted) in the Sankey display 1502 to indicate user sessions that traversed the selected node 1530. The selected node 1530, for example, can be designated that users are intended to arrive at. Such designated node for arrival can be termed a "golden node", for example. An analyst's selection of such golden node, node 1530 in this example, causes identifying in the Sankey display 1502, user sessions that successfully arrived at the intended node. The paths followed by the users 1540, for example, can be designated as "success paths", since users traversed these paths to successfully arrive at the so-called golden node 1530. The remaining multiple user interaction sessions, collectively labeled 1542, that did not arrive at the indicated node 1530 can be designated as failure paths, for example. An analyst can use the knowledge of success paths and failure paths in further evaluation of significance of user experiences during the user interaction sessions 1538.

Figure 15B:
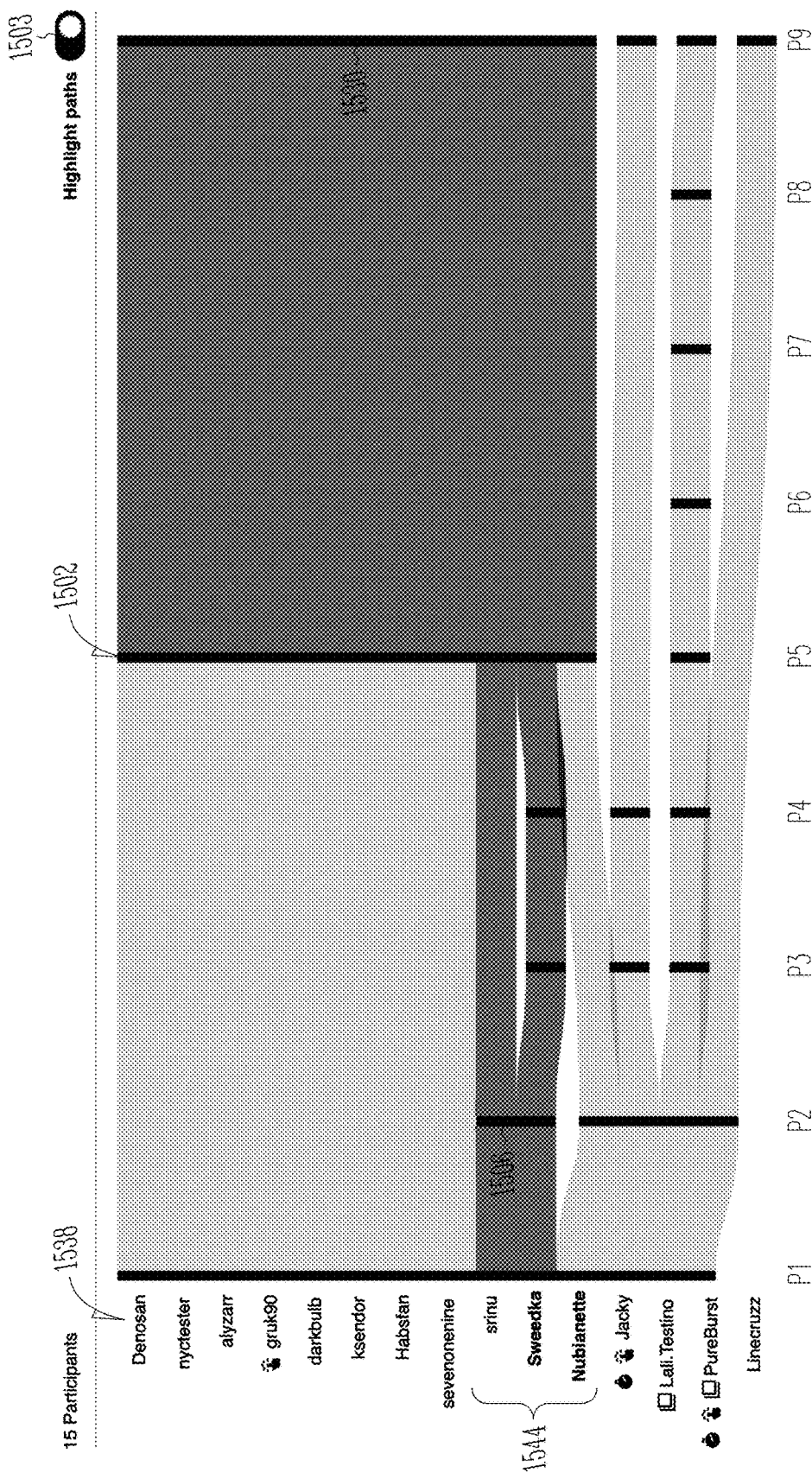
FIG. 15B is the illustrative Sankey diagram display of FIG. 15A in which two nodes are selected for session tracing.

FIG. 15B shows the illustrative Sankey diagram display 1502 of FIG. 15A in which an analyst selects nodes 1506 and 1530 at sequence positions P2 and P9. An analyst's selection of nodes 1506 and 1530 in this example, causes identifying of user sessions in the Sankey display 1502, collectively indicated by reference numeral 1544, that traverse both of the nodes 1506, 1530. The two nodes 1506, 1530 together represent a partial path the one or more user interaction sessions that traverse both of these nodes (user sessions 1544 in this example) node, also traverse other nodes. Thus, for example, an analyst can analyze which intermediate nodes (e.g., node 1506) were traversed by which user sessions (e.g., user sessions 1544) to arrive at an intended node (e.g., node 1530).

Figure 16A:
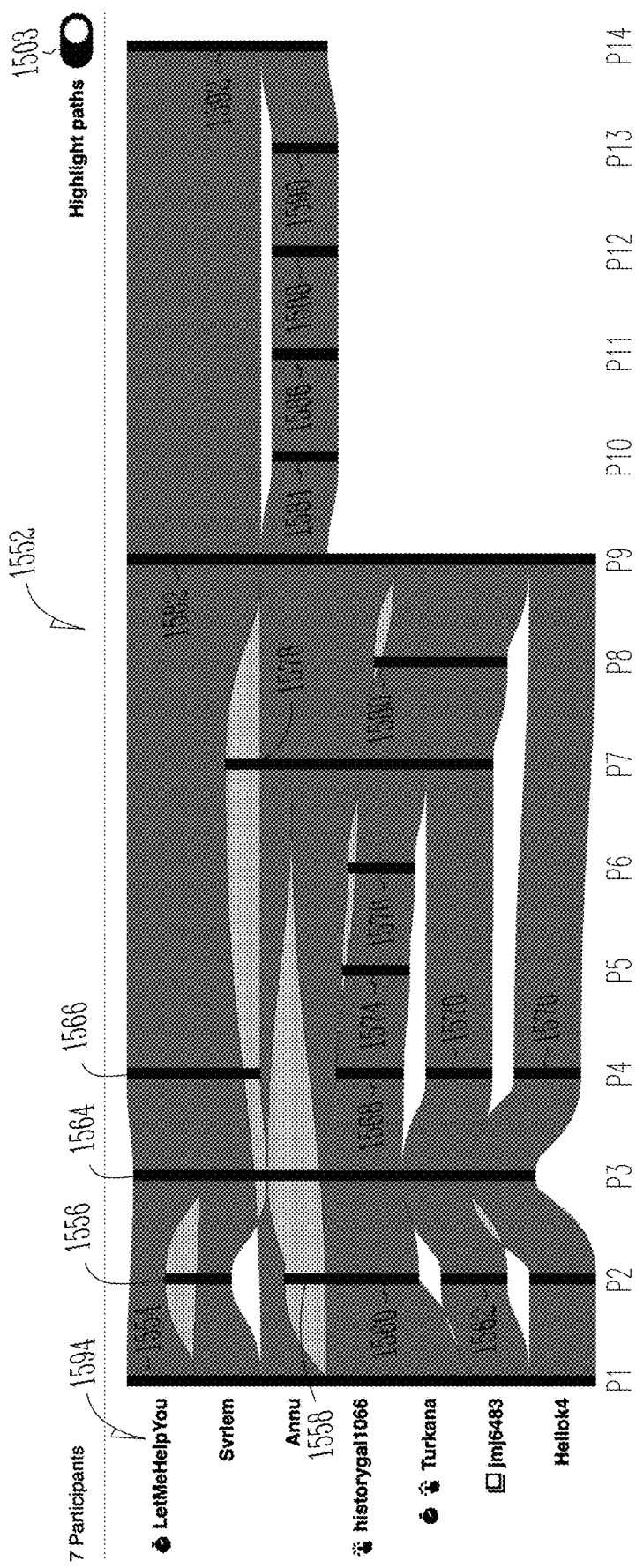
FIG. 16A is an illustrative Sankey diagram display in which a single relatively tall node is selected for session tracing.

FIG. 16A shows an illustrative Sankey diagram display 1552 including multiple nodes 1554-1592 aligned with sequence positions P1-P14 as shown, that represent seven (7) user interaction sessions 1594 in which an analyst selects node 1582 at sequence position P9. An analyst's selection of node 1582 in this example, causes identifying in the Sankey display 1552, of user all user sessions 1594 as having traversed node 1582. Nodes 1554 and 1582 are the tallest nodes in the Sankey diagram display 1552, and therefore, are the most heavily traversed nodes in this example. It will be appreciate that node 554, the node at the first sequence position P1 often represents an introductory display traversed by all sessions, and therefore, often is not as interesting for during analysis. Thus, for example, an analyst can analyze which user interaction sessions traversed any given individual node in the Sankey diagram display 1552, such as tall node 1582.

Figure 16B:
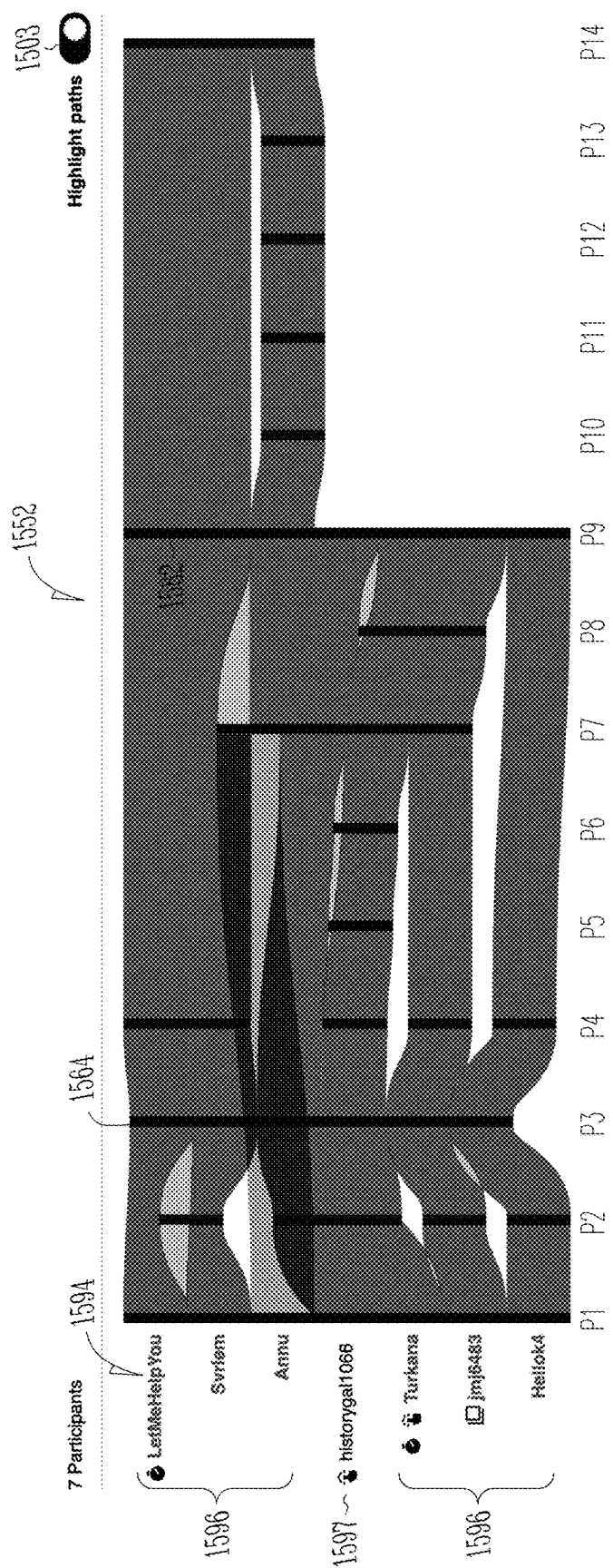
FIG. 16B is the illustrative Sankey diagram display of FIG. 16A in which two relatively tall nodes are selected for session tracing.

FIG. 16B shows the illustrative Sankey diagram display 1552 of FIG. 16A in which an analyst selects nodes 1564 and 1582 at sequence positions P3 and P9. An analyst's selection of nodes 1564 and 1582 in this example, causes identifying of the six (6) user interaction sessions, collectively labeled with reference numeral 1596 that traverses both nodes 1564, 1582. It is noted that both node 1564 and node 1582 are relatively tall nodes when compared with the other nodes of the Sankey display 1552. It is also noted that in this example, only user interaction session 1597 fails to traverse both nodes 1564 and 1582. Thus, for example, an analyst can identify user interaction sessions that traverse the taller more heavily used nodes, and conversely, can identify user interaction sessions such as session 1597 that do not travers the relatively taller nodes, and therefore, may be characterized as outlier or anomalous sessions.

Figure 16C:
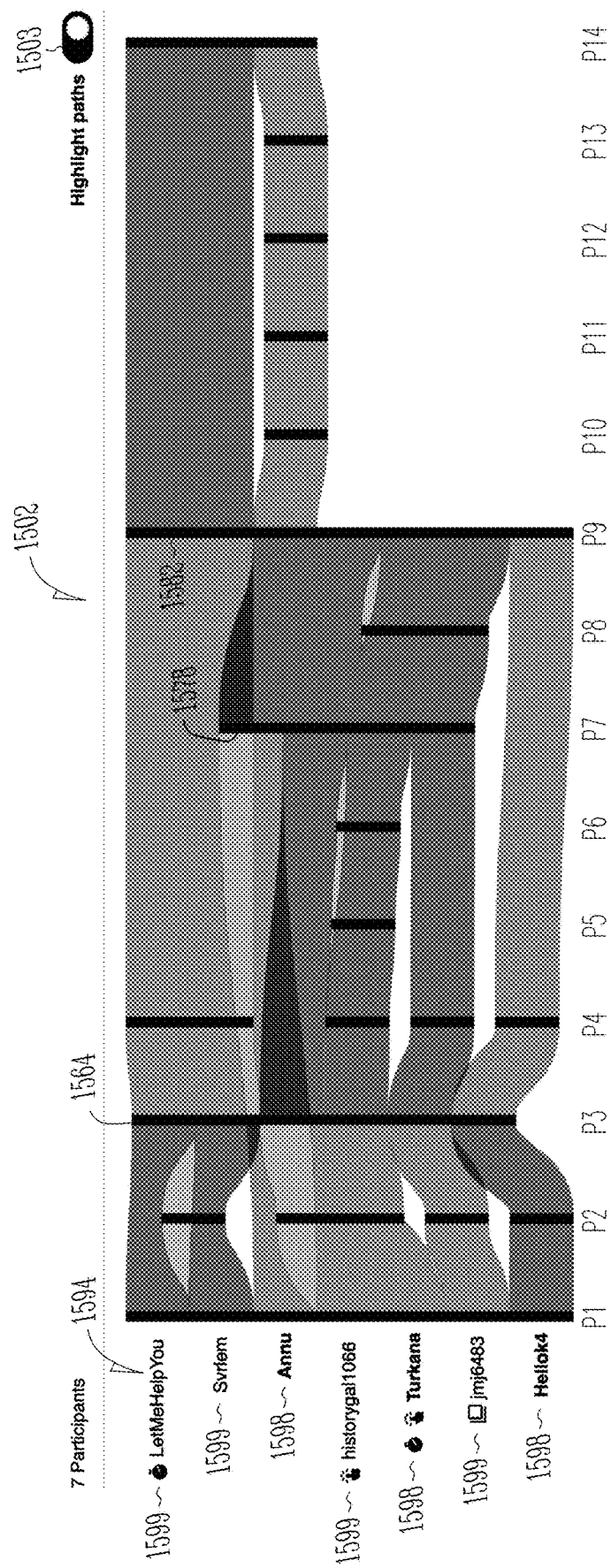
FIG. 16C is the illustrative Sankey diagram display of FIG. 16A in which three relatively tall nodes are selected for session tracing.

FIG. 16C shows the illustrative Sankey diagram display 1552 of FIGS. 16A-16B in which an analyst selects nodes 1564, 1578, and 1582 at sequence positions P3, P7, and P9. An analyst's selection of nodes 1564, 1578, and 1582 in this example, causes identifying of the three (3) user interaction sessions, collectively labeled with reference numeral 1598 that traverse each of nodes 1564, 1578, and 1582. It is noted that nodes 1564, 1578, and 1582 are relatively tall nodes when compared with the other nodes of the Sankey display 1552. It is also noted that in this example, that four user interaction sessions identified by reference numeral 1599 fail to traverse all three of nodes 1564, 1578, and 1582. Thus, for example, it will be appreciated that through the examples of FIGS. 16A-16C, an analyst can progressively identify and narrow down the user interaction sessions that traverse the taller more heavily used nodes, and conversely, can progressively identify user interaction sessions that do not travers the relatively taller nodes.

It will be further appreciated that, for example, an analyst can at will revert to displaying multiple user experience cards that correspond to a single user interaction session as shown in FIG. 10A, for example. Also, an analyst can at will revert to displaying multiple user experience cards that correspond to matching representative render structures that share a common sequence position, presented on a computing device display screen as shown in FIG. 11A. Thus, the system and method herein provide a rich variety of ways in which to evaluate user interaction sessions.

Figure 16D:
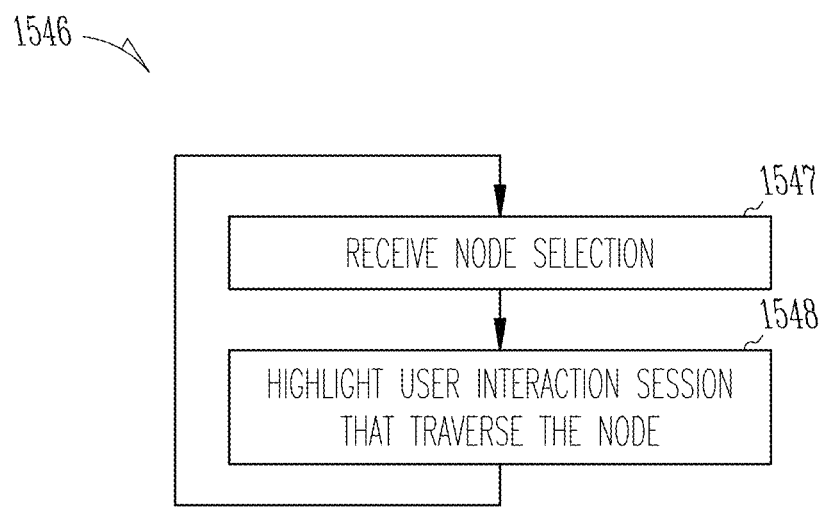
FIG. 16D is an illustrative flow diagram of an example process to display of tracing of user sessions traversing partial paths.

FIG. 16D is an illustrative flow diagram of an example process 1546 to display of tracing of user sessions traversing partial paths. The example process 1546 is used to implement the example Sankey diagram displays of FIGS. 15A-15B and FIGS. 16A-16C. The server computer system 1800 includes processor circuitry 1802 and a storage device 1804 that includes code executable by the processor to configure the server computer system to perform the operations of the process 1546. The process 1546 is operative when the server system 1800 is configured to operate in a tracing mode. Operation 1547 receives analyst input to select a node.

Operation 1548 highlights or otherwise emphasizes indicators of user interaction session sessions that traverse the selected node. Control next flows back to operation 1546 and the process recurses each time an additional node is selected. It will be appreciated that as illustrated in the examples of FIGS. 15A-15B and FIGS. 16A-16C, the selection of additional nodes can result in reduction in the number of highlighted indicators.

Image-Generated Render Structure

In an alternative example system, a render structure is generated based upon screen images. With webpages and mobile devices, DOMs and view hierarchies provide readily available render structures that can be used to produce an analytic interactive visualization (AIV) interface. However, the using image recognition, the principles described herein are applicable even if no a priori render structure is provided.

Figure 17:
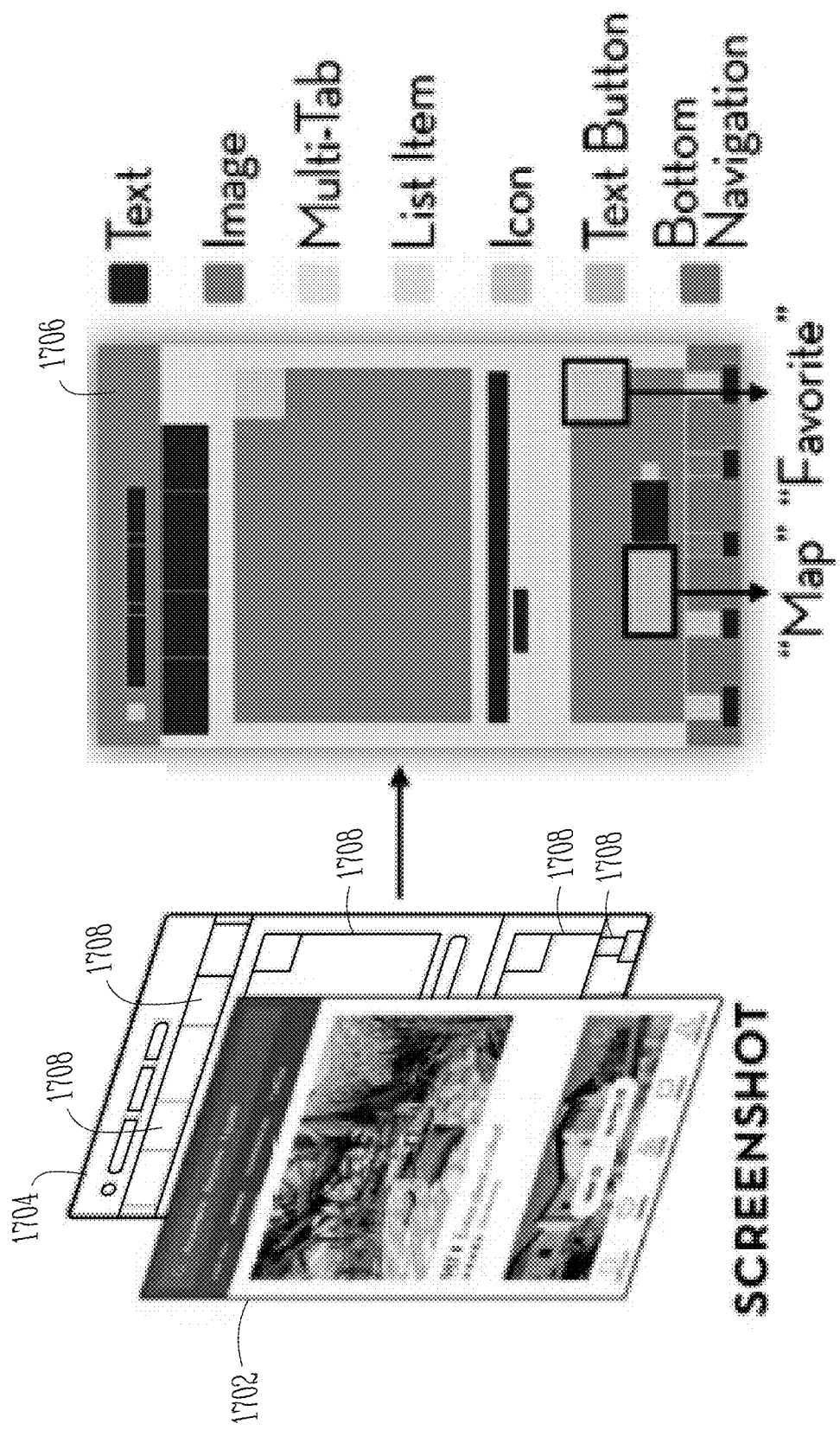
FIG. 17 is an illustrative drawing showing an image, a segmentation of the screen image and an example image-generated render structure.

FIG. 17 is an illustrative drawing showing an example screen image 1702, an example screen image segmentation 1704 and an example image-generated render structure 1706, which are shown in [017]. The screen image 1702 comprises an array of pixels. The segmentation 1704 comprises bounding boxes 1708 identifying regions of the screen image 1702 determined to represent different elements of the screen image. The image-generated render structure 1706 indicates functional elements and content elements of the screen image 1702. An example computer system 1800 is configured with a convolutional neural network (CNN) (not shown) to receive the pixels representing the screen image 1702 as input and to provide the image-generated render structure 1706 as output. An example CNN generates the segmentation 1704 as an intermediate result in the course of generating the image-generated render structure 1706. The image-generated render structure 1706 includes render structure elements that correspond to bounding box regions 1708 of the segmentation 1704. More particularly, the example image-generated render structure 1706 includes multiple text elements, multiple image content elements, one or more multi-tab elements, one or more list items, one or more text buttons, and multiple bottom navigation buttons. The example multi-tab elements, text buttons, and bottom navigation buttons are functional elements that can receive user input to initiate events. The multiple text elements, multiple image content elements, one or more list items are content elements. An example CNN includes processes to determine hierarchical and/or nested relationships among the various elements.

Each respective screen image 1702 corresponds to a respective image-generated render structure 1706. Each image-generated render structure 1706 is associated with a time stamp that corresponds to a time at which a screen image from which it was generated. Representative image-generated render structures are generated using a similarity metrics as described above. Sequences of representative image-generated render structures are allocated to sequence positions as described above. An AIV interface is presented using the representative image-generated render structures as described above.

Hardware Description

Figure 18:
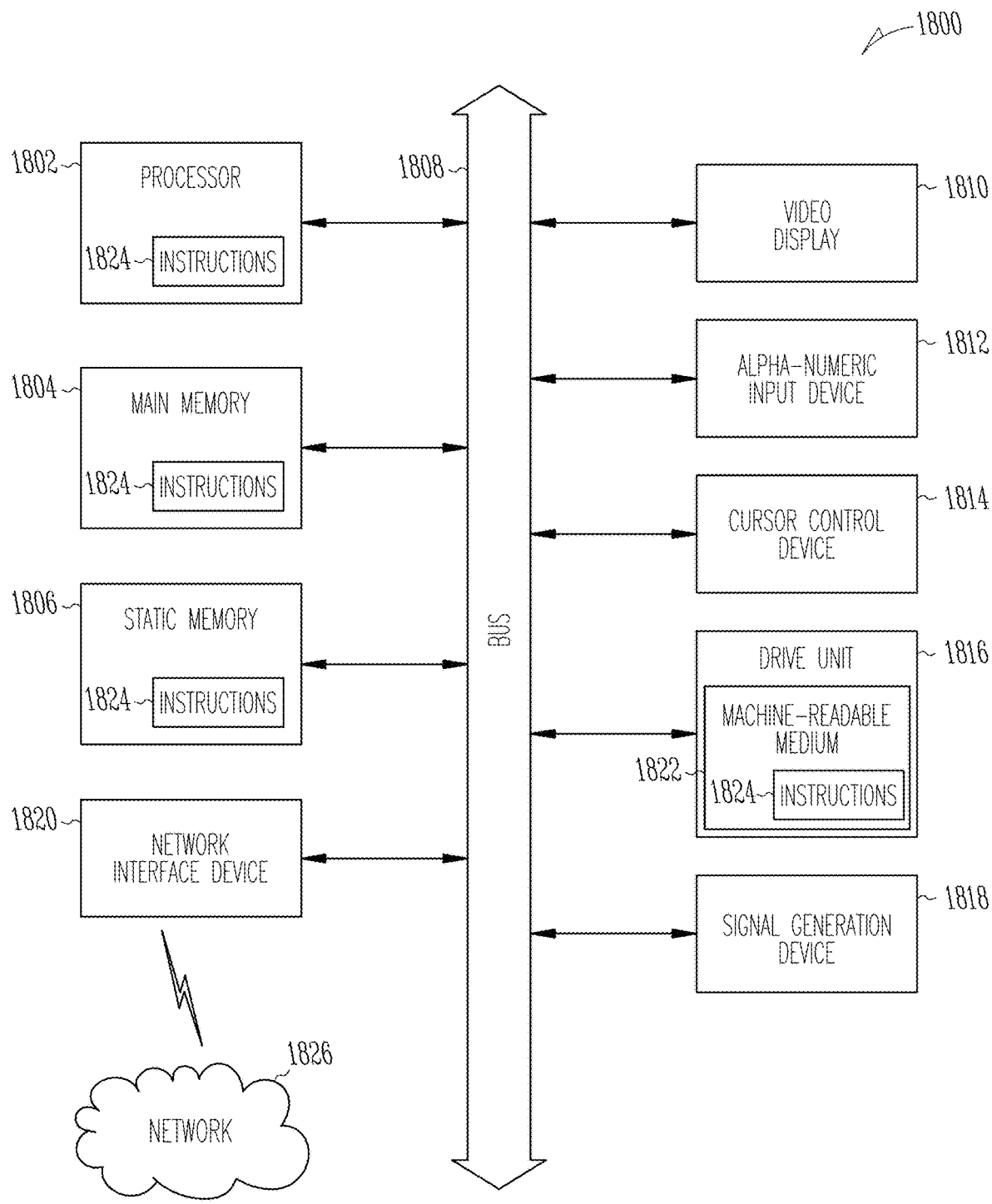
FIG. 18 is an illustrative block diagram of an example computer processing system in which to implement the server system.

FIG. 18 is an illustrative block diagram of an example computer processing system architecture in which to implement the server system 1800 and to implement the user computer systems 104. The computer system, or variations thereof, is configured using instructions executable by processor circuitry to implement the perform data filtering to identify chronological moments, similarity matching, user experience interface cards, sequence position alignment, and interactive Sankey diagrams. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment, for example. In a networked deployment, the computer may operate in the capacity of a server or a client computer in server-client network environment, or as a peer computer in a peer-to-peer (or distributed) network environment, for example.

The example computer processing system 1800 includes a hardware processor 1802 (e.g., a central processing unit (CPU), a graphics processing unit (GPU) or both), main memory 1804 and static memory 1806, which communicate with each other via bus 1808. The processing system 1800 may further include an electronic display unit 1820 (e.g., a plasma display, a liquid crystal display (LCD) or a cathode ray tube (CRT)). The processing system 2800 also includes alphanumeric input device 1822 (e.g., a keyboard), a user interface (UI) navigation device 1814 (e.g., a mouse, touch screen, or the like), a disk drive unit 1816, a signal generation device 1818 (e.g., a speaker), and a network interface device 1820.

The disk drive unit 1826, which can act as data storage 1825, includes computer-readable storage device 1822 on which is stored one or more sets of instructions and data structures (e.g., software 1824) embodying or utilized by any one or more of the methodologies or functions described herein. The software 1824 may also reside, completely or at least partially, within a computer readable storage device such as the main memory 1804 and/or within the processor 1822 during execution thereof by the processing system 1800, the main memory 1804 and the processor 1822 also constituting non-transitory computer-readable media. The software 1824 may further be transmitted or received over network 1826 via a network interface device 1820 utilizing any one of a number of well-known transfer protocols (e.g., HTTP).

The above description is presented to enable any person skilled in the art to create and use an interactive analytic visualization system and method. Various modifications to the embodiments will be readily apparent to those skilled in the art, and the generic principles defined herein may be applied to other embodiments and applications without departing from the spirit and scope of the invention. In the preceding description, numerous details are set forth for the purpose of explanation. However, one of ordinary skill in the art will realize that the embodiments in the disclosure might be practiced without the use of these specific details. In other instances, well-known processes are shown in block diagram form in order not to obscure the description of the invention with unnecessary detail. Identical reference numerals may be used to represent different views of the same or similar item in different drawings. Thus, the foregoing description and drawings of examples in accordance with the present invention are merely illustrative of the principles of the invention. Therefore, it will be understood that various modifications can be made to the embodiments by those skilled in the art without departing from the spirit and scope of the invention, which is defined in the appended claims.

The following is an Appendix of References cited in this specification.

APPENDIX OF REFERENCES

[1] 2011. Introducing Flow Visualization: Visualizing Visitor Flow. (2011). ifundefinedselectfont https://analytics.googleblog.com/2011/10/introducing-flow-visualization.html.

[2] 2018. Maximizing Process Performance with Maze, Uberiâ€™s Funnel Visualization Platform. (2018). ifundefinedselectfont https://eng.uber.com/maze/.

[3] 2020. Building a Data-Informed Onboarding Experience. (2020). ifundefinedselectfont https://www.pendo.io/resources/building-a-data-informed-onboarding-experience/.

[4] 2020. MutationObserver. (2020). ifundefinedselectfont https://developer.mozilla.org/en-US/docs/Web/API/MutationObserver.

[5] Jay Ayres, Jason Flannick, Johannes Gehrke, and Tomi Yiu. 2002. Sequential pattern mining using a bitmap representation. In *Proc. ACM SIGKDD international conference on Knowledge discovery and data mining*. 429-435.

[6] Michael Bostock, Vadim Ogievetsky, and Jeffrey Heer. 2011. D data-driven documents. *IEEE transactions on visualization and computer graphics* 17, 12 (2011), 2301-2309.

[7] Biplab Deka, Zifeng Huang, Chad Franzen, Joshua Hibschman, Daniel Afergan, Yang Li, Jeffrey Nichols, and Ranjitha Kumar. 2017a. Rico: A mobile app dataset for building data-driven design applications. In *Proc. UIST.* 845-854.

[8] Biplab Deka, Zifeng Huang, Chad Franzen, Jeffrey Nichols, Yang Li, and Ranjitha Kumar. 2017b. ZIPT: Zero-Integration Performance Testing of Mobile App Designs. In *Proc. UIST.* 727-736.

[9] Biplab Deka, Zifeng Huang, and Ranjitha Kumar. 2016. ERICA: Interaction mining mobile apps. In *Proc. UIST. ACM*, 767-776.

[10] Richard Durbin, Sean R Eddy, Anders Krogh, and Graeme Mitchison. 1998. *Biological sequence analysis: probabilistic models of proteins and nucleic acids.* Cambridge university press.

[11] Philippe Fournier-Viger, Cheng-Wei Wu, Antonio Gomariz, and Vincent S Tseng. 2014. VMSP. Efficient vertical mining of maximal sequential patterns. In *Canadian conference on artificial intelligence*. Springer, 83-94.

[12] David Gotz and Harry Stavropoulos. 2014. Decisionflow: Visual analytics for high-dimensional temporal event sequence data. *IEEE transactions on visualization and computer graphics* 20, 12 (2014), 1783-1792.

[13] Daniel A Keim, Jorn Schneidewind, and Mike Sips. 2005. Fp-viz: Visual frequent pattern mining. In *InfoVis*.

[14] Joseph B Kruskal and James M Landwehr. 1983. Icicle plots: Better displays for hierarchical clustering. *The American Statistician* 37, 2 (1983), 162-168.

[15] Ranjitha Kumar, Arvind Satyanarayan, Cesar Torres, Maxine Lim, Salman Ahmad, Scott R Klemmer, and Jerry O Talton. 2013. Webzeitgeist: design mining the web. In *Proc. CHI.* 3083-3092.

[16] Bing Liu and Lei Johnny Zhang. 2012. A Survey of Opinion Mining and Sentiment Analysis. In *Mining Text Data*.

[17] Thomas F Liu, Mark Craft, Jason Situ, Ersin Yumer, Radomir Mech, and Ranjitha Kumar. 2018. Learning design semantics for mobile apps. In *Proc. UIST.* 569-579.

[18] Zhicheng Liu, Bernard Kerr, Mira Dontcheva, Justin Grover, Matthew Hoffman, and Alan Wilson. 2017. Coreflow: Extracting and visualizing branching patterns from event sequences. In *Computer Graphics Forum*, Vol. 36. Wiley Online Library, 527-538.

[19] Zipeng Liu, Zhicheng Liu, and Tamara Munzner. 2020. Data-driven Multi-level Segmentation of Image Editing Logs. In *Proc. CHI.* 1-12.

[20] Zhicheng Liu, Yang Wang, Mira Dontcheva, Matthew Hoffman, Seth Walker, and Alan Wilson. 2016. Patterns and sequences: Interactive exploration of clickstreams to understand common visitor paths. *IEEE Transactions on Visualization and Computer Graphics* 23, 1 (2016), 321-330.

[21] Sana Malik, Fan Du, Megan Monroe, Eberechukwu Onukwugha, Catherine Plaisant, and Ben Shneiderman. 2015. Cohort comparison of event sequences with balanced integration of visual analytics and statistics. In *Proc. International Conference on Intelligent User Interfaces*. 38-49.

[22] Sana Malik, Ben Shneiderman, Fan Du, Catherine Plaisant, and Margret Bjarnadottir. 2016. High-volume hypothesis testing: Systematic exploration of event sequence comparisons. *ACM Transactions on Interactive Intelligent Systems (TiiS)* 6, 1 (2016), 1-23.

[23] Megan Monroe, Rongjian Lan, Hanseung Lee, Catherine Plaisant, and Ben Shneiderman. 2013. Temporal event sequence simplification. *IEEE transactions on visualization and computer graphics* 19, 12 (2013), 2227-2236.

[24] Adam Perer and Fei Wang. 2014. Frequence: Interactive mining and visualization of temporal frequent event sequences. In *Proc. Conference on Intelligent User Interfaces*. 153-162.

[25] Patrick Riehmann, Manfred Hanfler, and Bernd Froehlich. 2005. Interactive sankey diagrams. In *IEEE Symposium on INFOVIS*. IEEE, 233-240.

[26] Joao Carlos Setubal and Joao Meidanis. 1997. *Introduction to computational molecular biology*. Number 04; QH506, S4. PWS Pub. Boston.

[27] John Stasko and Eugene Zhang. 2000. Focus+ context display and navigation techniques for enhancing radial, space-filling hierarchy visualizations. In *IEEE Symposium on Information Visualization 2000. INFOVIS 2000. Proceedings*. IEEE, 57-65.

[28] Gang Wang, Xinyi Zhang, Shiliang Tang, Haitao Zheng, and Ben Y Zhao. 2016. Unsupervised clickstream clustering for user behavior analysis. In *Proc. CHI*. 225-236.

[29] Krist Wongsuphasawat, John Alexis Guerra Gómez, Catherine Plaisant, Taowei David Wang, Meirav Taieb-Maimon, and Ben Shneiderman. 2011. LifeFlow: visualizing an overview of event sequences. In *Proc. CHI*. 1747-1756.

[30] Jian Zhao, Zhicheng Liu, Mira Dontcheva, Aaron Hertzmann, and Alan Wilson. 2015. Matrixwave: Visual comparison of event sequence data. In *Proc. CHI*. 259-268.

The invention claimed is:

1. A computer-implemented method for presenting commonalities of digital experiences across user interaction sessions with an interactive electronic user interface, the method comprising:
    receiving at a storage device of a computer system, multiple interaction sessions, each interaction session including a sequence of render structures and a corresponding sequence of clusters of user experience information;
    producing for each user interaction session, using the computing system, a corresponding sequence of representative render structures, each representative render structure having a sequence position and representing a subsequence of respective render structures of the user interaction session;
    associating in a memory device, each representative render structure determined for an interaction session with a different cluster of user experience information from the interaction session;
    determining structurally matching render structures within different sequences of representative render structures, based at least in part upon similarity among the representative render structures within the different sequences of representative render structures;
    inserting one or more gap positions between sequence positions in one or more of the sequences of representative render structures to align sequence positions of one or more structurally matching representative render structures within different sequences of representative render structures;
    displaying on an electronic display screen, multiple node indicators, each node indicator having a sequence position corresponding to a sequence position of one or more matching representative render structures within the aligned sequences of representative render structures; and
    in response to receiving a user selection at a respective node indicator, displaying user experience information from each cluster of user experience information associated in the memory device with a representative render structure having a sequence position that matches the sequence position of the selected node indicator.

2. The method of claim 1,
wherein the user experience information for one or more interaction sessions includes one or more event information.

3. The method of claim 1,
wherein the user experience information one or more interaction sessions includes motion picture sequence information.

4. The method of claim 1,
wherein one or more representative render structures includes a document object model (DOM element.

5. The method of claim 1,
wherein one or more representative render structures includes a view hierarchy.

6. The method of claim 1,
wherein one or more representative render structures include a hierarchical tree render structure.

7. The method of claim 1,
wherein the multiple node indicators are arranged in a Sankey diagram.

8. The method of claim 1,
wherein displaying the user experience information from one or more clusters includes displaying a user experience interface card that includes a selectable indicator of one or more events; further including:
    in response to a user selection of an indicator of one or more events at a user experience interface card, displaying on the electronic display screen a motion picture sequence representing the one or more events.

9. The method of claim 1,
displaying on an electronic display screen one or more respective interactive session indicators, each respective interactive session indicator corresponding to a respective interaction session; and
    in response to receiving a user selection of a respective interactive session indicator, displaying on the electronic display screen, user experience information from each cluster of user experience information included in an interactive session corresponding to the selected respective interaction session.

10. A digital experience management system comprising:
processor circuitry; and
the memory storing instructions which, when executed by the processing circuitry, cause the processing circuitry to perform operations comprising:
receiving at a storage device of a computer system, multiple interaction sessions, each interaction session including a sequence of render structures and a corresponding sequence of clusters of user experience information;
producing for each user interaction session, using the computing system, a corresponding sequence of representative render structures, each representative render structure having a sequence position and representing a subsequence of respective render structures of the user interaction session;
associating in a memory device, each representative render structure determined for an interaction session with a different cluster of user experience information from the interaction session;
determining structurally matching render structures within different sequences of representative render structures, based at least in part upon similarity among the representative render structures within the different sequences of representative render structures;
inserting one or more gap positions between sequence positions in one or more of the sequences of representative render structures to align sequence positions of one or more structurally matching representative render structures within different sequences of representative render structures;
displaying on an electronic display screen, multiple node indicators, each node indicator having a sequence position corresponding to a sequence position of one or more matching representative render structures within the aligned sequences of representative render structures; and
in response to receiving a user selection at a respective node indicator, displaying user experience information from each cluster of user experience information associated in the memory device with a representative render structure having a sequence position that matches the sequence position of the selected node indicator.

11. The system of claim 1,
wherein displaying the user experience information from one or more clusters includes displaying a user experience interface card that includes a selectable indicator of one or more events; operations further including:
in response to a user selection of an indicator of one or more events at a user experience interface card, displaying on the electronic display screen a motion picture sequence representing the one or more events.

12. A computer-implemented method for presenting commonalities of digital experiences during multiple user interaction sessions with an interactive electronic user interface, the method comprising:
adjusting, in a computer system, render structure sequence positions of at least one of respective first and second render structures, included within respective first and second user experience clusters, within different ones of multiple sequences of user experience clusters captured during the multiple user interaction sessions to align the first and second render structures at a first render structure sequence position, based at least in part upon similarity of the first render structure and the second render structure to one another;
adjusting, in the computer system, render structure sequence positions of at least one of respective third and fourth render structures, included within respective third and fourth user experience clusters, within different ones of the multiple sequences of user experience clusters captured during the multiple user interaction sessions to align the third and fourth render structures at a second render structure sequence position, based at least in part upon similarity of the third render structure and the fourth render structure to one another;
displaying on an electronic display screen a sequence of node indicators, wherein a first node indicator is displayed at a first node indicator sequence position within the sequence of node indicators, that corresponds to the first render structure sequence position, and wherein a second node indicator is displayed at a second node indicator sequence position, within the sequence of node indicators, that corresponds to the second render structure sequence position;
responding to a user selection of the first node indicator, by displaying on the electronic display screen, user experience information from at least the first and second user experience clusters; and
responding to a user selection of the second node indicator, by displaying on the electronic display screen, user experience information from at least the third and fourth user experience clusters.

13. The method of claim 12 further including:
displaying on the electronic display screen one or more respective session indicators, each respective session indicator corresponding to a respective sequence of user experience clusters; and
responding to a user selection of a respective session indicator, by displaying on the electronic display screen respective user experience information from multiple user experience clusters included in a respective sequence of user experience clusters corresponding to the respective selected session indicator.

14. The digital experience management system of claim 12,
wherein each respective cluster of user experience information displayed on the display screen includes an indication of one or more events; further including:
responding to a user selection of an indicator of one or more events by displaying on the electronic display screen a motion picture sequence corresponding to the selected one or more events.

15. The method of claim 12,
wherein the sequence of node indicators is arranged in a Sankey diagram.

16. A digital experience management system comprising:
processing circuitry;
a memory operably coupled to the processing circuitry, that stores instructions which, when executed by the processing circuitry, cause the processing circuitry to perform operations comprising:
adjusting, in a computer system, render structure sequence positions of at least one of respective first and second render structures, included within respective first and second user experience clusters, within different ones of multiple sequences of user experience clusters captured during the multiple user interaction sessions to align the first and second render structures at a first render structure sequence position, based at least in part upon similarity of the first render structure and the second render structure to one another;

adjusting, in the computer system, render structure sequence positions of at least one of respective third and fourth render structures, included within respective third and fourth user experience clusters, within different ones of the multiple sequences of user experience clusters captured during the multiple user interaction sessions to align the third and fourth render structures at a second render structure sequence position, based at least in part upon similarity of the third render structure and the fourth render structure to one another;

displaying on an electronic display screen a sequence of node indicators, wherein a first node indicator is displayed at a first node indicator sequence position within the sequence of node indicators, that corresponds to the first render structure sequence position, and wherein a second node indicator is displayed at a second node indicator sequence position, within the sequence of node indicators, that corresponds to the second render structure sequence position;

responding to a user selection of the first node indicator, by displaying on the electronic display screen, user experience information from at least the first and second user experience clusters; and responding to a user selection of the second node indicator, by displaying on the electronic display screen, user experience information from at least the third and fourth user experience clusters.

17. The digital experience management system of claim 16,
each respective user experience cluster including one or more events.

18. The digital experience management system of claim 16,
each respective user experience cluster including one or more motion picture sequences.

19. The digital experience management system of claim 16, the operations further including:
displaying on the electronic display screen one or more respective session indicators, each respective session indicator corresponding to a respective sequence of user experience clusters; and
responding to a user selection of a respective session indicator, by displaying on the electronic display screen respective user experience information from multiple user experience clusters included in a respective sequence of user experience clusters corresponding to the respective selected session indicator.

20. The digital experience management system of claim 16,
wherein the user experience information displayed on the display screen from at least the first and second user experience clusters includes for each respective one of the at least the first and second user experience clusters, a respective indication of one or more events; the operations further including:
responding to a user selection of a respective indicator of one or more events by displaying on the electronic display screen a motion picture sequence corresponding to the selected one or more events.

21. The digital experience management system of claim 16,
the operations further including:
displaying on an electronic display screen of multiple respective session indicators, each respective session indicator corresponding to a respective sequence of user experience clusters; and responding to a user selection of a respective session indicator, by displaying on the electronic display screen respective user experience information from at least one user experience cluster included in a respective sequence of user experience clusters corresponding to the respective selected session indicator.

22. The digital experience management system of claim 16,
wherein the sequence of node indicators is arranged in a Sankey diagram.

23. A computer-implemented method for presenting commonalities of digital experiences during multiple user interaction sessions with an interactive electronic user interface, the method comprising:
in a computer system, determining structurally similar render structures within different sequences of representative render structures;
in the computer system, inserting one or more gap positions between sequence positions in one or more sequences of render structures, included within different ones of multiple sequences of user interaction clusters captured during the multiple user interaction sessions, to align sequence positions of one or more structurally similar render structures within the different sequences of render structures;
displaying on an electronic display screen a sequence of node indicators having respective node indicator sequence positions that correspond to respective render structure sequence positions; and
responding to a user selection of node indicator, by displaying on the electronic display screen, user experience information from at least one user experience cluster that includes a render structure having a render structure sequence position that corresponds to a node indicator sequence position of the selected node indicator.

24. The method of claim 23,
wherein responding to the user selection of node indicator, includes displaying on the electronic display screen, user experience information from each of two or more user experience clusters that includes a render structure having a render structure sequence position that corresponds to the node indicator sequence position of the selected node indicator.

25. The method of claim 23,
wherein responding to the user selection of node indicator, includes displaying on the electronic display screen, user experience information from each user experience cluster that includes a render structure having a render structure sequence position that corresponds to the node indicator sequence position of the selected node indicator.

26. The method of claim 23,
wherein responding to the user selection of node indicator, includes displaying on the electronic display screen, user experience information from a selectable range of user experience clusters that include a render structure having a render structure sequence position that corresponds to the node indicator sequence position of the selected node indicator; and further including:
receiving user selection of a range of user experience clusters.

27. The method of claim 23,
wherein each respective user experience cluster includes one or more events.

28. The method of claim 23,
wherein each respective user experience cluster includes one or more motion picture sequences.

29. The method of claim 23,
wherein the user experience information displayed on the display screen from from the at least one user experience cluster includes an indication of one or more events; the operations further including:
responding to a user selection of an indicated event by displaying on the electronic display screen a motion picture sequence corresponding to the selected event.

30. The method of claim 23,
wherein inserting one or more gap positions between sequence positions in one or more sequences of render structures includes, inserting based at least in part upon similarity of render structures within different sequences of render structures, to align the sequence positions of one or more render structures within the different sequences of render structures based at least in part upon render structure similarity.

31. The method of claim 23,
wherein the sequence of node indicators is arranged in a Sankey diagram.

32. A digital experience management system comprising:
processing circuitry;
a memory operably coupled to the processing circuitry, that stores instructions which, when executed by the processing circuitry, cause the processing circuitry to perform operations comprising:
determining structurally similar render structures within different sequences of representative render structures:
inserting one or more gap positions between sequence positions in one or more sequences of render structures, included within different ones of multiple sequences of user interaction clusters captured during the multiple user interaction sessions, to align sequence positions of one or more structurally similar render structures within the different sequences of render structures;
displaying on an electronic display screen a sequence of node indicators having respective node indicator sequence positions that correspond to respective render structure sequence positions; and
responding to a user selection of node indicator, by displaying on the electronic display screen, user experience information from at least one user experience cluster that includes a render structure having a render structure sequence position that corresponds to a node indicator sequence position of the selected node indicator.

33. The digital experience management system of claim 31,
wherein responding to the user selection of node indicator, includes displaying on the electronic display screen, user experience information from each of two or more user experience clusters that includes a render structure having a render structure sequence position that corresponds to the node indicator sequence position of the selected node indicator.

34. The digital experience management system of claim 31,
wherein responding to the user selection of node indicator, includes displaying on the electronic display screen, user experience information from each user experience cluster that includes a render structure having a render structure sequence position that corresponds to the node indicator sequence position of the selected node indicator.

35. The digital experience management system of claim 31,
wherein responding to the user selection of node indicator, includes displaying on the electronic display screen, user experience information from a selectable range of user experience clusters that include a render structure having a render structure sequence position that corresponds to the node indicator sequence position of the selected node indicator; and further including:
receiving user selection of a range of user experience clusters.

36. The digital experience management system of claim 31,
wherein each respective user experience cluster includes one or more events.

37. The digital experience management system of claim 31,
wherein each respective user experience cluster includes one or more motion picture sequences.

38. The digital experience management system of claim 31,
wherein the user experience information displayed on the display screen from from the at least one user experience cluster includes an indication of one or more events; the operations further including:
responding to a user selection of an indicated event by displaying on the electronic display screen a motion picture sequence corresponding to the selected event.

39. The digital experience management system of claim 31,
wherein inserting one or more gap positions between sequence positions in one or more sequences of render structures includes, inserting based at least in part upon similarity of render structures within different sequences of render structures, to align the sequence positions of one or more render structures within the different sequences of render structures based at least in part upon render structure similarity.

40. The digital experience management system of claim 31,
wherein the sequence of node indicators is arranged in a Sankey diagram.

41. A non-transitory computer-readable storage medium including a set of instructions that, when executed by one or more computer processors, causes the one or more computer processors to perform operations comprising:
adjusting render structure sequence positions of at least one of respective first and second render structures, included within respective first and second user experience clusters, within different ones of multiple sequences of user experience clusters captured during the multiple user interaction sessions to align the first and second render structures at a first render structure sequence position, based at least in part upon similarity of the first render structure and the second render structure to one another;
adjusting render structure sequence positions of at least one of respective third and fourth render structures, included within respective third and fourth user experience clusters, within different ones of the multiple sequences of user experience clusters captured during the multiple user interaction sessions to align the third and fourth render structures at a second render structure sequence position, based at least in part upon similarity of the third render structure and the fourth render structure to one another;

displaying on an electronic display screen a sequence of node indicators, wherein a first node indicator is displayed at a first node indicator sequence position within the sequence of node indicators, that corresponds to the first render structure sequence position, and wherein a second node indicator is displayed at a second node indicator sequence position, within the sequence of node indicators, that corresponds to the second render structure sequence position;

responding to a user selection of the first node indicator, by displaying on the electronic display screen, user experience information from at least the first and second user experience clusters; and responding to a user selection of the second node indicator, by displaying on the electronic display screen, user experience information from at least the third and fourth user experience clusters.

42. A non-transitory computer-readable storage medium including a set of instructions that, when executed by one or more computer processors, causes the one or more computer processors to perform operations comprising:

determining structurally similar render structures within different sequences of representative render structures;

inserting one or more gap positions between sequence positions in one or more sequences of render structures, included within different ones of multiple sequences of user interaction clusters captured during the multiple user interaction sessions, to align sequence positions of one or more structurally similar render structures within the different sequences of render structures;

displaying on an electronic display screen a sequence of node indicators having respective node indicator sequence positions that correspond to respective render structure sequence positions; and responding to a user selection of node indicator, by displaying on the electronic display screen, user experience information from at least one user experience cluster that includes a render structure having a render structure sequence position that corresponds to a node indicator sequence position of the selected node indicator.

\* \* \* \* \*